United States Patent [19]

Onaga et al.

[11] Patent Number: 4,925,312

[45] Date of Patent: May 15, 1990

[54] ROBOT CONTROL SYSTEM HAVING ADAPTIVE FEEDFORWARD TORQUE CONTROL FOR IMPROVED ACCURACY

[75] Inventors: Eimei M. Onaga, Brookfield Center; Richard J. Casler, Jr., Newton; Rajan C. Penkar, Woodbury; Roy E. Lancraft, Southbury, all of Conn.; Chi Sha, Pittsburgh, Pa.

[73] Assignee: Staubli International AG, Switzerland

[21] Appl. No.: 171,500

[22] Filed: Mar. 21, 1988

[51] Int. Cl.$^5$ .................. G06F 15/46; G05B 19/407
[52] U.S. Cl. .................. 364/513; 318/568.22; 364/165; 364/174; 901/2; 901/9; 901/20
[58] Field of Search .................. 364/513, 191–193, 364/174, 164, 165; 318/561, 568; 901/2–5, 9, 20, 23, 24, 41, 46; 414/730

[56] References Cited

U.S. PATENT DOCUMENTS

| 4,362,978 | 12/1982 | Pollard et al. | 364/513 X |
| 4,598,380 | 7/1986 | Holmes et al. | 364/513 |
| 4,603,284 | 7/1986 | Perzley | 364/513 X |
| 4,623,971 | 11/1986 | Ailman et al. | 364/513 |

Primary Examiner—Joseph Ruggiero
Attorney, Agent, or Firm—Mason, Kolehmainen, Rathburn & Wyss

[57] ABSTRACT

A digital control provides adaptive feedforward torque control for a robot having a plurality of arm joints. An electric motor drives each of the robot arm joints and a power amplifier supplies drive current to each motor under controlled operation.

Each joint motor has feedback control loop means including position and velocity control loops driving a torque control loop in accordance with position commands to generate motor commands for controlling the associated power amplifier. The motion of said joint motor generates position and velocity feedback signals respectively for combination with the position and velocity commands to generate an error signal as a torque command for each of the torque control loops from the corresponding position and velocity control loops. Load force is sensed at the endmost robot joint. The actual load moment for each robot joint on the basis of the load force and the dynamic/kinematic data moment is computed for each robot joint on the basis of stored dynamic and kinematic data for the robot arm. The data and load moments are combined for each joint and applied as a feedforward torque for combination with the position and velocity errors in generating the torque command for each of the torque control loops. A feedback signal representative of the joint motor drive current is combined with the torque command to generate a torque error signal in each torque control loop.

10 Claims, 16 Drawing Sheets

ROBOT CONTROL SYSTEM HAVING ADAPTIVE FEEDFORWARD TORQUE CONTROL FOR IMPROVED ACCURACY

CROSS-REFERENCE TO RELATED APPLICATIONS

The following U.S. Patents and patent applications, each filed on Nov. 20, 1986, assigned to the present assignee disclose a digital robot control in which the present invention may be embodied and are hereby incorporated by reference:

Ser. No. 932,975, now continuation Ser. No. 180,719, filed Apr. 4, 1988, entitled DIGITAL ROBOT CONTROL HAVING AN IMPROVED CURRENT SENSING SYSTEM FOR POWER AMPLIFIERS IN A DIGITAL ROBOT CONTROL and filed by K. E. Daggett, L. C. Vercellotti, R. A. Johnson, R. J. Casler, Jr., and E. M. Onaga.

Ser. No. 932,841, now continuation Ser. No. 231,627, filed Aug. 5, 1988, entitled DIGITAL ROBOT CONTROL HAVING AN IMPROVED PULSE WIDTH MODULATOR and filed K. E. Daggett.

Ser. No. 932,992 entitled COMMUNICATIONS INTERFACE FOR A MULTIPROCESSOR SERVO CONTROL IN A MULTIAXIS ROBOT CONTROL and filed by K. E. Daggett.

U.S. Pat. No. 4,763,055 entitled DIGITAL ROBOT CONTROL HAVING HIGH PERFORMANCE SERVO CONTROL SYSTEM and filed by Kenneth E. Daggett, Richard J. Casler and Eimei Onaga.

Ser. No. 932,974, now continuation Ser. No. 178,813, filed Apr. 1, 1988, entitled DIGITAL ROBOT CONTROL SYSTEM PROVIDING PULSE WIDTH MODULATION FOR A BRUSHLESS DC DRIVE and filed by K. E. Daggett, R. A. Johnson, E. M. Onaga and R. J. Casler.

Ser. No. 932,853, now continuation Ser. No. 178,822, filed Apr. 1, 1988, entitled IMPROVED POSITION AND VELOCITY FEEDBACK SYSTEM FOR A DIGITAL ROBOT CONTROL and filed by K. E. Daggett, R. J. Casler and E. M. Onaga.

Ser. No. 932,982 entitled UNIVERSAL ROBOT CONTROL BOARD CONFIGURATION and filed by R. J. Casler, E. M. Onaga, V. P. Jalbert, B. L. Booth and K. E. Daggett.

Ser. No. 932,991 entitled BASIC DIGITAL MULTIAXIS ROBOT CONTROL HAVING MODULAR PERFORMANCE EXPANSION CAPABILITY and filed by K. E. Daggett, E. M. Onaga, R. J. Casler, Jr. and B. L. Booth.

U.S. Pat. No. 4,786,847 entitled DIGITAL ROBOT CONTROL SYSTEM PROVIDING IMPROVED ROBOT PERFORMANCE WITH COST EFFECTIVENESS AND CONTROL UNIT MANUFACTURING ECONOMY and filed by K. E. Daggett, E. M. Onaga, R. J. Casler, Jr., B. L. Booth, R. J. Penkar et al., L. C. Vercellotti and R. A. Johnson.

Ser. No. 932,983 entitled MODULAR ROBOT CONTROL SYSTEM and filed by K. E. Daggett, E. M. Onaga, B. L. Booth, R. J. Casler, Jr. and V. P. Jalbert.

Ser. No. 932,977, now continuation Ser. No. 180,601, filed Apr. 6, 1988, entitled MULTIPROCESSOR TORQUE SERVO CONTROL FOR MULTIAXIS DIGITAL ROBOT CONTROL SYSTEM and filed by K. E. Daggett, E. M. Onaga and R. J. Casler, Jr.

Ser. No. 932,990, now continuation Ser. No. 180,723, filed Apr. 4, 1988, entitled MULTIPROCESSOR POSITION/VELOCITY SERVO CONTROL FOR MULTIAXIS DIGITAL ROBOT CONTROL SYSTEM and filed by R. E. Lancraft, K. E. Daggett, E. M. Onaga, R. J. Casler, Jr., B. L. Booth, N. J. Bergman and M. D. Muncy.

U.S. Pat. No. 4,829,219 entitled MULTIAXIS ROBOT CONTROL HAVING VARIABLE ACCELERATION/DECELERATION PROFILING and filed by R. C. Penkar and N. Tan.

U.S. Pat. No. 4,774,445, entitled MULTIAXIS ROBOT CONTROL HAVING CAPABILITY FOR EXECUTING TIMED MOVES and filed by R. C. Penkar.

U.S. Pat. No. 4,772,831, entitled MULTIAXIS ROBOT CONTROL HAVING IMPROVED CONTINUOUS PATH OPERATION and filed by R. J. Casler, Jr. and R. C. Penkar.

U.S. Pat. No. 4,773,025, entitled MULTIAXIS ROBOT CONTROL HAVING FITTED CURVE PATH CONTROL and filed by R. C. Penkar and T. P. Skewis.

Ser. No. 932,973, now continuation Ser. No. 180,598, filed Apr. 6, 1988, entitled MULTIAXIS ROBOT CONTROL HAVING IMPROVED ENERGY MONITORING SYSTEM FOR PROTECTING ROBOTS AGAINST JOINT MOTOR OVERLOAD and filed by E. M. Onaga and R. J. Casler, Jr.

U.S. Pat. No. 4,807,153 entitled MULTIAXIS DIGITAL ROBOT CONTROL HAVING A BACKUP VELOCITY MONITOR AND PROTECTION SYSTEM and filed by E. M. Onaga and R. J. Casler, Jr.

BACKGROUND OF THE INVENTION

The present invention relates to multiaxis robot controls and more particularly to digital robot controls in which end effector position is controlled through operation of a torque control loop.

In controlling the motion of a robot arm, a command path is typically implemented through the operation of cascaded position, velocity and torque control loops. Output signals from the torque control loop for each joint operate as motor drive commands which cause the joint motor to develop the torque needed to satisfy position, velocity and acceleration commands and move the joint over the commanded joint path. In aggregate, all of the joints move in coordination to satisfy the end effector command path.

During changes in velocity, i.e., during acceleration from rest to slew velocity and deceleration from slew velocity to rest and during changes in slew velocity, a torque command signal must be generated in the control looping to produce motor drive commands. If the torque command is derived only from position and velocity error, actual position error can become relatively large especially during larger changes in velocity such as during startup and stopping. The robot is thus caused to operate with undesired path tracking inaccuracy. Settling error can also be excessive where overshoot occurs.

In the prior art, position inaccuracy due to lag in torque development has been reduced to some extent by employing in each joint control a feedforward torque signal derived from the command acceleration and an inertia constant for the associated link. This type of feedforward control has been employed for example in the digital robot control system exemplary of the type disclosed in U.S. Pat. Nos. 4,763,055 and 4,786,847, which are assigned to the same assignee as the presently assigned invention.

Path control accuracy has nonetheless been deficient with feedforward acceleration adjustment, largely because the prior art tuning constant, i.e. inertia, is a fixed parameter determined by measurements on the particular robot operated by the control. In actuality, link inertia varies with load and with arm configuration. Typically, feedback gains and acceleration commands in the prior art have had to be compromised for worst case arm configurations. Thus, the prior art has achieved some but not enough improvement in path accuracy, and the reason for the shortcoming is that the prior art has not had adaptive capability for addressing variability in the causes of path error.

The present invention advances the state of the art by achieving improved robot path control accuracy with adaptive and preferably digitally implemented feedforward torque control.

SUMMARY OF THE INVENTION

A robot control is provided with a power ampifier to supply drive current to each of the robot joint motors. Means are provided for sensing load force applied to at least a predetermined one of the robot joints. Further, means are provided for computing the actual load moment for each robot joint on the basis of the output from the force sensing means and for computing the dynamic/kinematic data movement for each robot joint on the basis of stored dynamic and kinematic data for the robot arm. The data and load moments are combined for each joint to generate a feedforward torque therefor. Feedback control loop means for each joint motor includes a torque control loop to generate motor commands for the associated power amplifier in accordance with position commands and in accordance with the feedforward torque.

BRIEF DESCRIPTION OF THE DRAWINGS

FIGS. 6A-1 and 6A-2 show a schematic diagram of a first electronic torque processor (TP) board employed as a basic torque servo control for the robot control system;

FIGS. 7A-1 and 7A-2 show a schematic diagram of a second electronic TP board which has hardware identity with the first TP board of FIGS. 6A-1 and 6A-2 but is otherwise adapted to operate as a feedforward torque controller for the basic torque servo control on the first TP board;

DESCRIPTION OF THE PREFERRED EMBODIMENT

Figure 1:
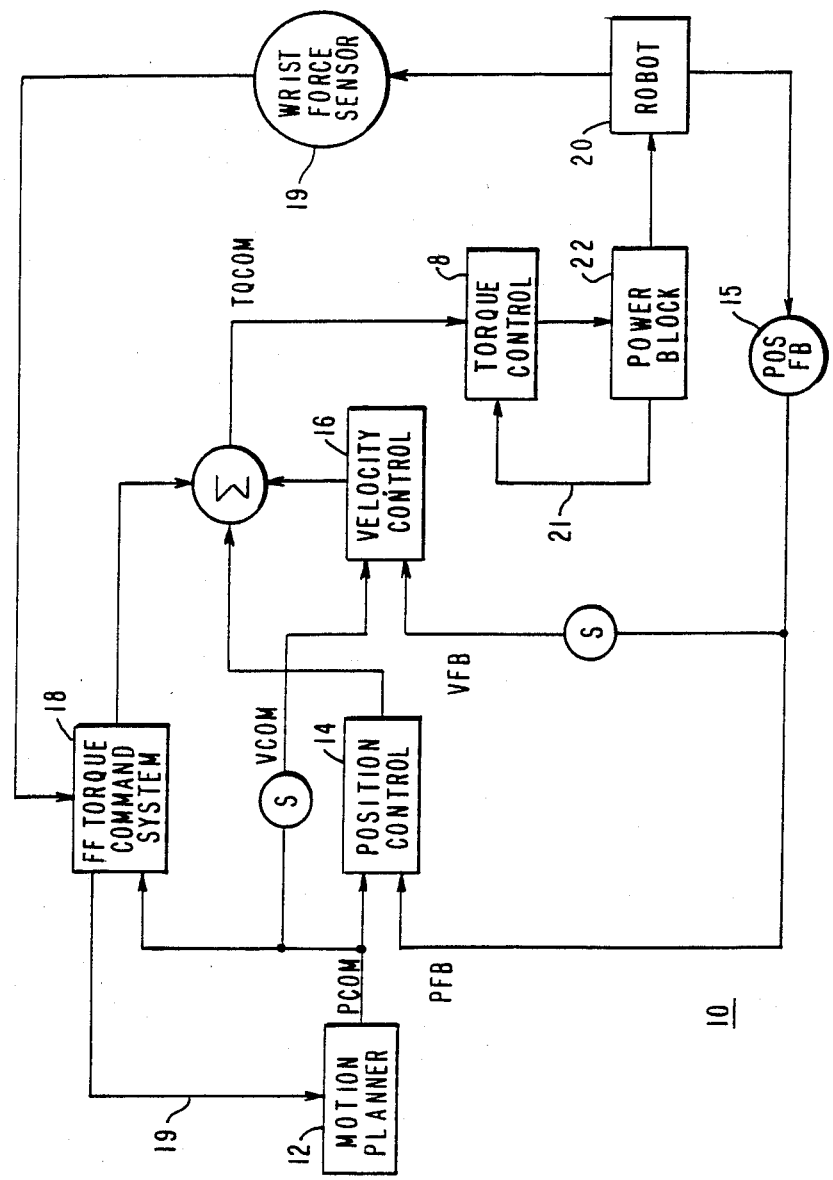
FIG. 1 shows a block diagram of a general robot control loop embodying the present invention.

As shown in its preferred form in FIG. 1, a robot control system 10 is arranged to include adaptive feedforward torque control that provides improved robot operation in accordance with the invention. A control arrangement like that shown is used for each robot axis and all axis controls are operated in coordination to produce the commanded motion for the robot end effector.

A motion planner 12 generates successive position commands that define commanded joint motion. A position control 14 generates a position error from each position command and a position feedback signal from sensor 15.

Velocity commands are derived from the position commands and applied to a velocity control 16. Velocity error is generated by the velocity control 16 from each velocity command and velocity feedback which is derived from the position feedback.

A feedforward torque command system 18 adaptively generates torque commands that enable faster and more accurate satisfaction of position, velocity and acceleration commands in accordance with the invention. The torque commands are computed from inputs including position commands and feedback force from sensor 19 preferably located at the endmost (wrist) robot joint. By responding to actual wrist force in making torque command calculations, the feedforward torque command system generates torque commands in accordance with arm inertia changes, i.e. changes in robot load and robot arm configuration. Improved adaptive operation of the robot is thus enabled, i.e. reduced position error and more accurate end effector motion are produced.

The position and velocity errors and the feedforward torque command are summed and applied to a torque control 8. Joint motor drive commands are generated from the torque command and from current feedback indicated by the reference character 21 and applied to a power block (amplifier) for the joint motor. Motor current is thus controlled to produce the joint torque needed to satisfy higher level commands.

Additional benefits are obtained through the application of calculated actual motor torque to the motion planner 12 as indicated by the reference character 19. The motor planner 12 reduces or increases speed/acceleration for the next cycle on the basis of the relationship of actual torque and the known available torque.

DIGITAL CONTROL LOOPS—GREATER DETAIL

Figure 2:
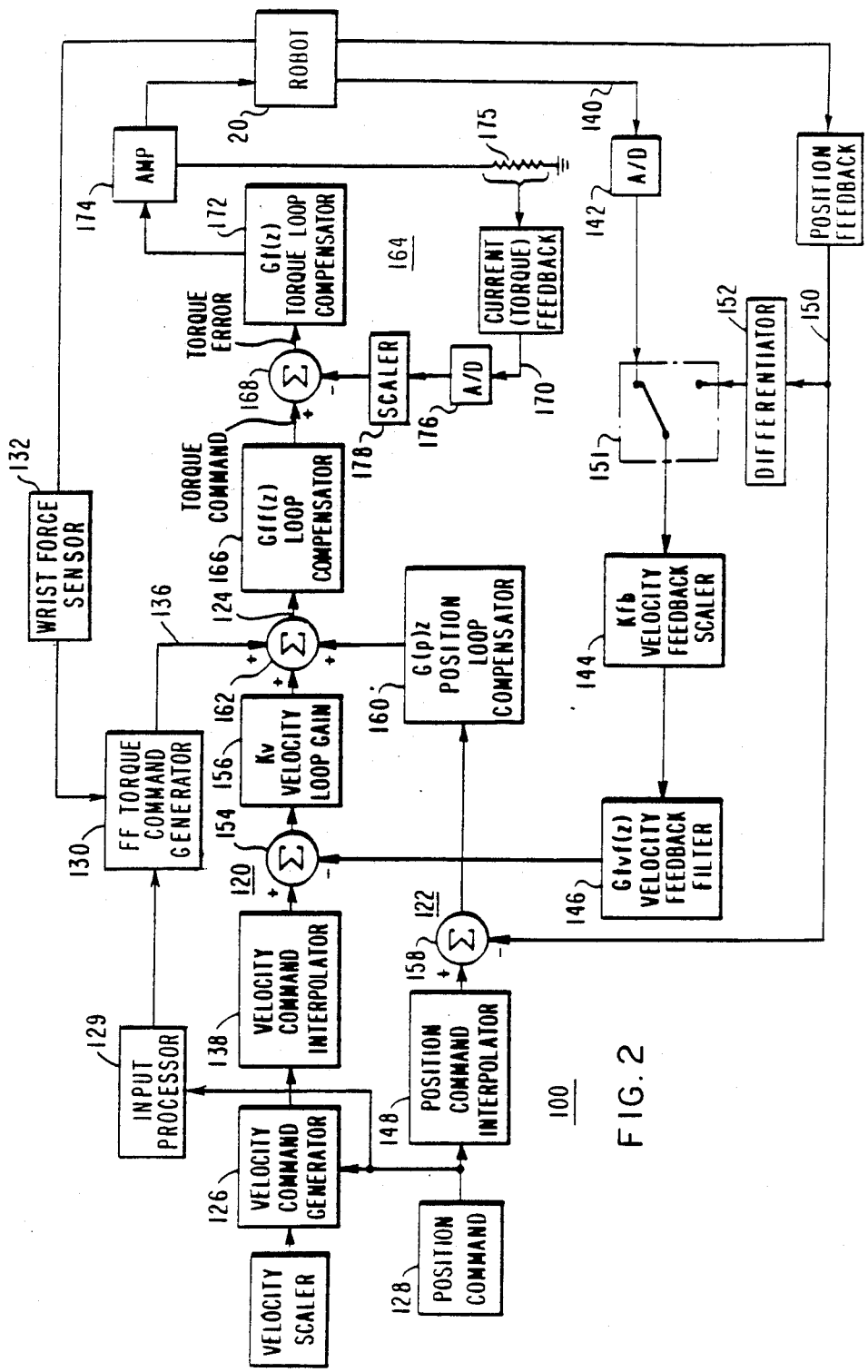
FIG. 2 shows a more detailed digital robot control loop embodying the present invention.
Figure 3:
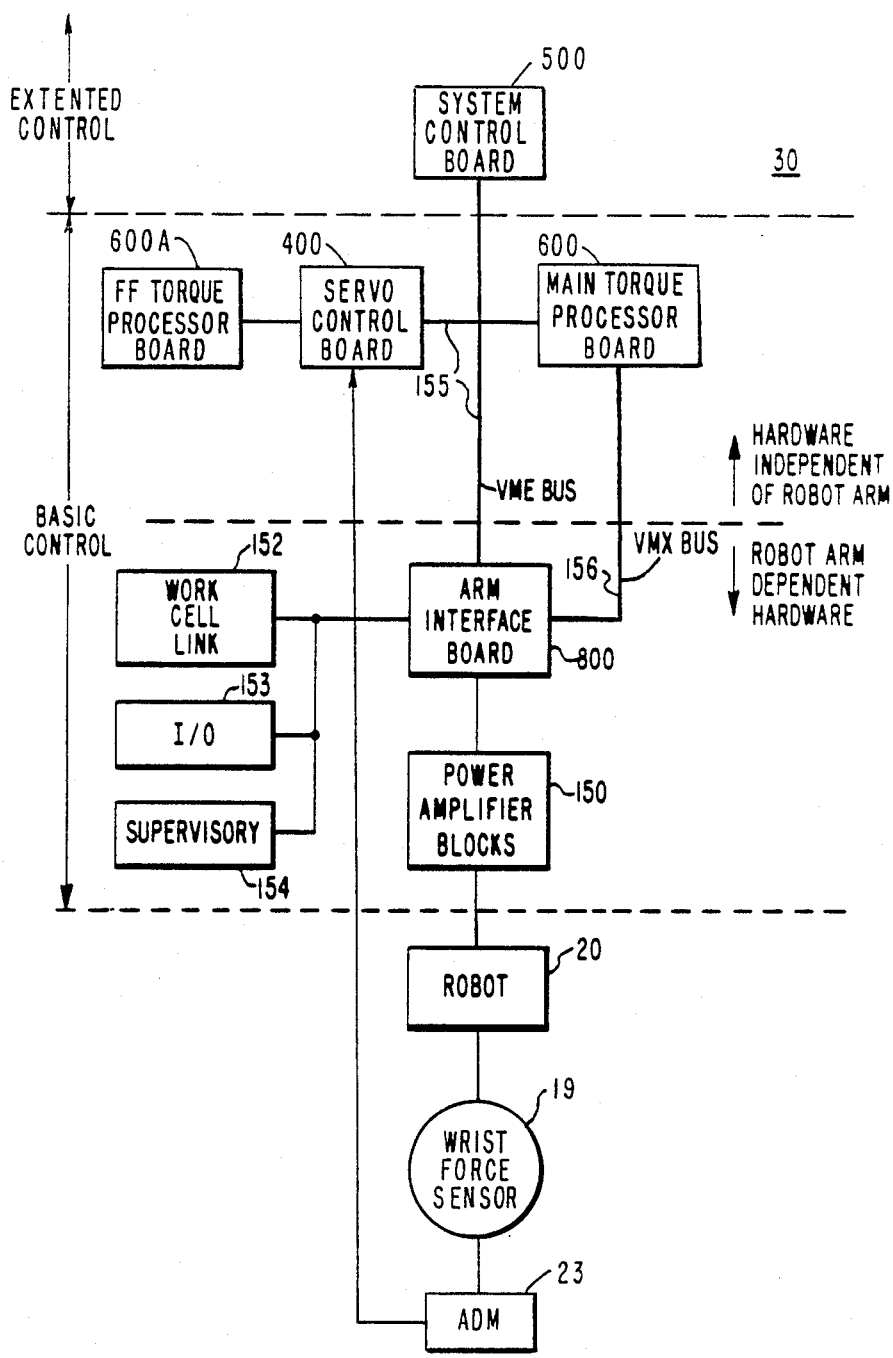
FIG. 3 shows a preferred circuit board arrangement for implementing the digital control loop of FIG. 2.

In FIG. 2, there is shown a digital control loop configuration 100 preferably employed for each joint motor in the robot control 30 of FIG. 3 and embodying the present invention. The control loop configuration 100 is preferably implemented as a completely digital control. The provision of hierarchical architecture and multi-processor architecture and floating point hardware is described herein in the above-referred U.S. patents and related U.S applications and patents referenced therein. The trajectory cycle can be characterized with a cycle time in the range of 32 to 8 milliseconds depending on the employed modular configuration.

In the preferred control loop arrangement 100, position control loop 122 and velocity control loop 120 are parallel fed to the input of a torque control loop 124. Velocity commands are generated by block 126 from position commands received by block 128.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced control has a trajectory cycle of 8 milliseconds.

In any case, a velocity command generator 126 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in incorporated-by-reference continuation application Ser. No. 231,627 and continuation application Ser. No. 178,811 as on page 1 hereof.

Feedforward torque commands are computed in generator block 130 and implemented in control loop operation to provide more accurate robot motion over commanded paths. An algorithm in the feedforward torque command generator block 130 employs dynamic and kinematic data and operates on inputs derived in block 129 from position commands 128 and wrist force feedback from sensor 132 to generate the feedforward torque commands.

Velocity error is generated by summer 154 with gain applied by box 156. Similarly, position error is generated by summer 158 with gain applied by box 160.

Velocity and position errors and feedforward torque commands are summed in summer 162. As will become more evident from this invention disclosure, the implementation of substantially accurate torque feedforward enables velocity and position errors to be reduced as joint motor drive currents are generated to satisfy robot position commands. Performance is thus significantly improved.

Gain is applied by box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error (motor voltage commands) and pulse width modulated (PWM) output signals are applied to a power amplifier 174 which supplies the motor drive current for robot joint operation. Current feedback from resistor 172 is sampled every 250 microseconds (see U.S. Pat. No. 4,763,055) and converted to digital signals by box 176 with scaling applied by box 178.

OVERVIEW—ELECTRONIC BOARDS

Implementation of the control looping for the robot control 30 in FIG. 3 is achieved by the use of digital control circuitry disposed on a plurality of electronic boards. The organization of the circuitry on the boards and the partitioning of programming among various microprocessors (1) enables advanced robot control performance to be achieved with a modular control configuration characterized with economy of manufacture, and (2) facilitates variability of configuration which enables universality of use and flexibility in choice of level of control performance.

As shown in FIG. 3, the control board configuration includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A basic torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls as well as other robot controls.

The basic torque processor board 600 provides motor torque control in response to commands from the servo control board 400. In turn, the servo control board 400 provides arm solutions and position and velocity control in accordance with a robot control program.

In implementing the present invention, a supplemental feedforward torque processor (FFTP) board 600A is linked to the servo control board 400. The FFTP board 600A is essentially identical to the TP board 600 as to hardware but it is provided with different software, i.e. software that adapts the TP board 600A to function as the feedforward torque command generator. Generally, to FFTP board 600A calculates a set of torques needed to satisfy the motion commands for the robot joints. The calculated torques are sent to the servo control board 400 where they are implemented as feedforward torque commands in the torque command channels for the respective joint controls.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 and other robots with significantly faster control action, i.e., with a trajectory cycle shortened from thirty-two milliseconds to eight milliseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 3) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the U.S. Pat. Nos. 4,763,055 and 4,786,847 and related U.S applications and patents referenced therein.

The robot control 10 is universally and flexibly applicable to differing kinds and sizes of robots in stand alone or robotic network operation, as more fully explained in these references.

FURTHER DESCRIPTION OF BOARD IMPLEMENTATION CIRCUITRY BASIC TORQUE PROCESSOR BOARD CONCEPTS

The basic torque processor (TP) board 600 provides a functional interface to the robot joint drive motors. Functionally, the basic TP board 600 implements the lowest level of control in the hierarchical control system, providing closed loop servo torque control for six robot axes. Physically, the basic TP board 600 electrically interfaces the robot path planning control system and the servo control (SCM) board with the arm interface (AIF) board 800, which in turn interfaces to the robot joint drive motors. The primary function of the basic TP board 600 is to regulate robot joint motor currents to commanded values by generating motor winding voltage commands which are executed using a pulse width modulation scheme on the AIF board.

The basic TP board 600 interfaces at one level to the SCM board, accepts from the SCM board torque commands and servo parameters for six axes and returns status data. The basic TP board 600 interfaces at a second lower level to the AIF board 800 providing servo voltage commands for the six robot axes. The AIF board 800 receives drive motor current, position and velocity feedback for closed loop control on the SCM and TP boards.

The basic TP board 600 employs the paired microprocessor to provide a number of features including the following:

1. Torque loop control for six axes (250 micro sec per 6 axes) for brush and brushless motors;
2. Software adjustable current offset—eliminates potentiometers;
3. Downloadable gains—arm dependent parameters can be downloaded from the SCM board;
4. PWM compensation;
5. Commutation compensation;
6. Current averaging for data logging and other purposes;
7. Current limit check for safety;
8. Velocity monitoring (back emf) for safety check;
9. Energy check (IIT) to test stall condition;
10. Power-up self diagnostics; and
11. Downloadable diagnostics system.

BASIC TORQUE PROCESSOR BOARD

More advanced robot performance is produced by digitally controlling the torque applied at the arm workpoint when the arm is in motion to control the arm workpoint position in accordance with a command trajectory. Axis drive forces are adjusted in accordance with actually experienced workpiece loading to satisfy position and trajectory commands with greater speed, accuracy and efficiency.

The basic torque processor board 600 is a generic control circuit board 600, (FIGS. 3, 6A-1 and 6A-2), an electronic board usable to provide torque control for a wide variety of robots having different load capacities, different types of drives, different numbers of axes, etc.

The basic TP board 600 employs digital circuitry to generate voltage commands for each joint motor or axis drive on the basis of torque commands obtained from a higher control level (SCM board) and feedback currents obtained through the arm interface (AIF) board 800 from the axis drives. Thus, the torque control loops for all of the joint motors are closed through the TP board circuitry.

In the case of electric drives, the feedback current is the motor winding current which is proportional to actual motor torque. For hydraulic drives, the feedback current is also proportional to actual motor torque.

The digital torque control circuitry is preferably structured with multiple digital processors so that needed control computation and control support functions can be achieved for all axes accurately and efficiently within sampling frequency requirements.

In particular, a torque control manager 602 interfaces with a dual port SCM interface memory 604 for the exchange of stored torque control data between the SCM (servo control module) and the TP (torque processor) control levels. Axis torque commands and control loop parameters are downloaded from the SCM to the TP interface memory 604 through a data bus 606 preferably of the VME type. In return, status data is uploaded to the servo control level (SCM). The interface memory 604 between the Tp and SCM boards is a dual port shared memory which serves as a slave to the VME bus 606. Other board memories include a ping-pong memory 608, program EPROM 614, local RAM 616, and TP calculator memory.

The torque control manager 602 also directs the flow of current feedback from circuitry on the AIF board 800 at the next lower control level to the torque processor board 600 for torque control loop operation. Drive voltage commands resulting from torque control calculations are directed to the arm interface (AIF) board 800 by the torque control manager 602. The ping-pong (bank switched) memory 608 operates under the control of handshake flags to store command, feedback, and status data so that it is available when needed for torque control calculations or for higher control level reporting requirements or for axis drive control.

A coprocessor 610 provided in the form of a digital signal processor operates as a torque loop calculator which receives torque commands and feedback currents from the torque control manager 602 through the ping-pong memory 608, calculates drive voltage commands for the various robot axes from the torque errors computed from the torque commands and feedback currents, and transfers the drive voltage commands through the ping-pong memory 608 to the arm interface circuitry on command from the torque control manager 602.

With the described digital circuit structure, all needed torque control functions are able to be performed rapidly (250 microsecond sampling rate or better) and accurately within frequency bandwidth requirements. Specifically, the rapid calculating capability of the digital signal processor 610 is employed for the torque control calculations as the data organizing and directing capability of the torque control manager 602 is employed for most other functions thereby enabling highly improved control performance to be achieved efficiently and economically.

The torque control manager 602 has an architecture well suited for the tasks described for data management but which has a calculating speed (i.e., over 4 microseconds for a 16×16 bit multiplication) too limited to meet torque control bandwidth requirements. The digital signal processor 610 has an architecture set for Z transform calculations (i.e., a calculating speed of 200 nanoseconds for a 16×16 bit multiplication) but which is otherwise generally unsuitable for the kinds of tasks assigned to the data manager processor 602. These two microprocessors function together as a unit or, in other terms, as a servo engine.

For more detail on the basic torque board circuitry, reference is made to the parent and continuation U.S. application Ser. No. 180,601 filed on Apr. 16, 1988, or U.S. Ser. No. 932,992, filed on Nov. 20, 1986.

FEEDFORWARD TORQUE PROCESSOR BOARD

Figures 1, 7A:
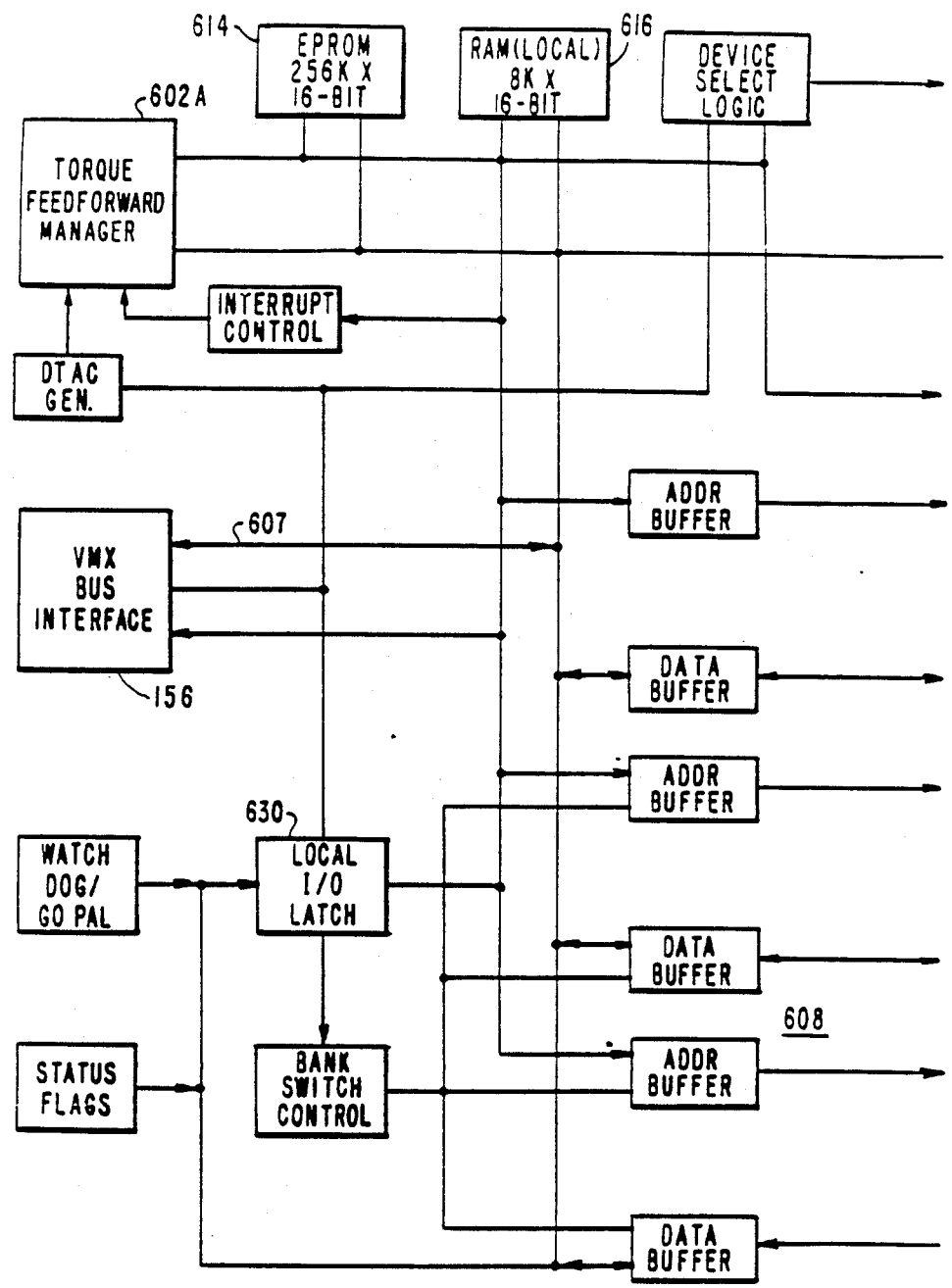
Figures 2, 7A:
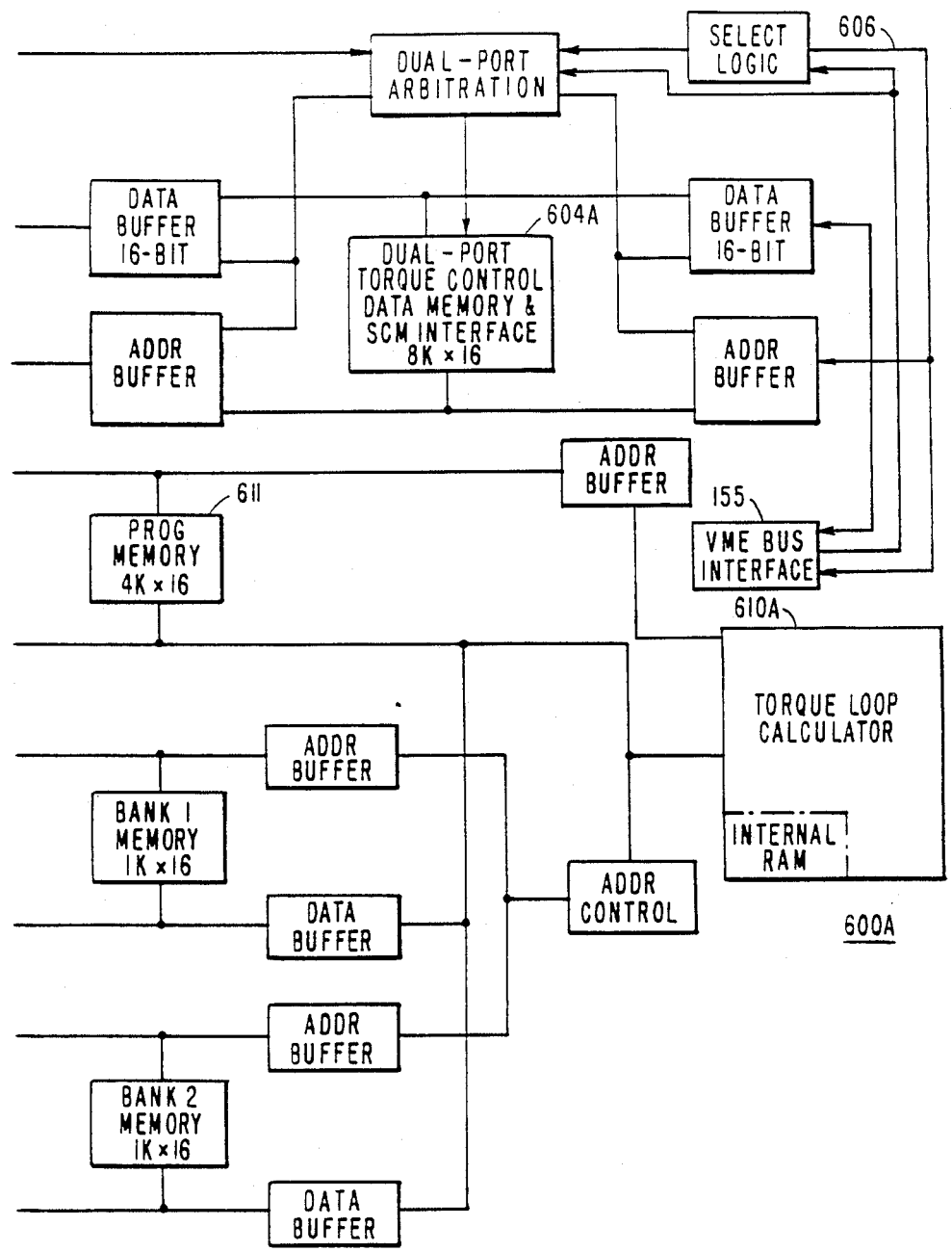

The feedforward torque processor (FFTP) board 600A is shown in FIGS. 7A-1 and 7A-2. It is identical to the basic TP board 600 from a hardware standpoint. Accordingly, like hardware elements are numbered identically.

Software differences provide for different functioning by the FFTP board 600A. Accordingly, the processors and the dual port board interface memory are designated by different names to reflect different functioning resulting from different software.

Particularly, a torque estimator 600A is a coprocessor that computes the actual torques for all of the robot joints on the basis of stored kinematic and dynamic data and actual joint torques.

A torque feedforward (TFF) 602A interfaces with a dual port torque feedforward control data memory 604A to enable interfacing between the SCM board 400 and the FFTP board 600A. Download designated data to the ping pong memory input buffer include position commands and actual joint force signals. Upload data includes calculated torque signals.

The TFF manager 602A further provides for transferring calculated torques from the torque estimator 610A to the dual port memory 604A and the SCM board 400 and for transferring actual joint force from the SCM board 400 and the dual port memory 604A to the torque estimator 610A.

BASIC TORQUE CONTROL PROGRAMMING

The basic torque processor board 600 is operated under the control of programs executed in the on board processors 602 and 610 to implement torque command signals from the higher SCM control level.

The basic torque processor software generally performs the following tasks which are partitioned as indicated:

Torque Control Manager 602

Communication with SCM and with feedforward torque control board 600A
Command handling
Current sampling, conversion and offset adjustment
Commutation switch flag (state reading)
Ping-pong memory management
PWM chip management
Diagnostics
Error reporting

Torque Loop Calculator 610 program cycling based on 250 microsecond interrupt

Overcurrent check—absolute and average
Torque loop calculations
Current averaging
PWM compensation
Commutation compensation
Back emf check—monitors velocity for safety
Energy check—tests for stall conditions
Reference is made to U.S. Pat. No. 4,763,055 for more detail on TP software structure and operation.

FFTP BOARD PROGRAMMING—GENERAL TF MANAGER

Figure 5:
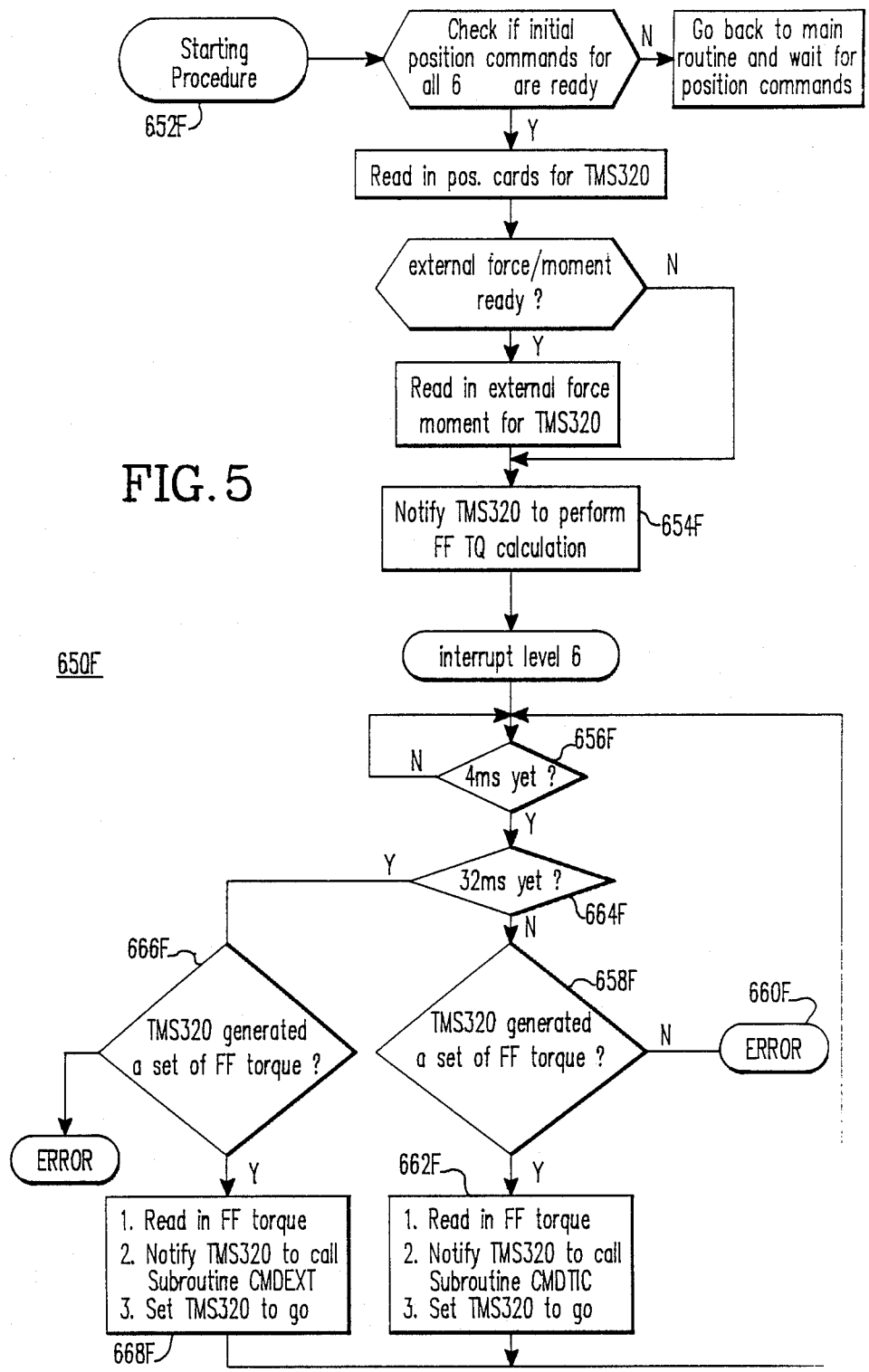
FIG. 5 shows flow charting for data processing associated with the feedforward torque control.
Figures 1, 6A:
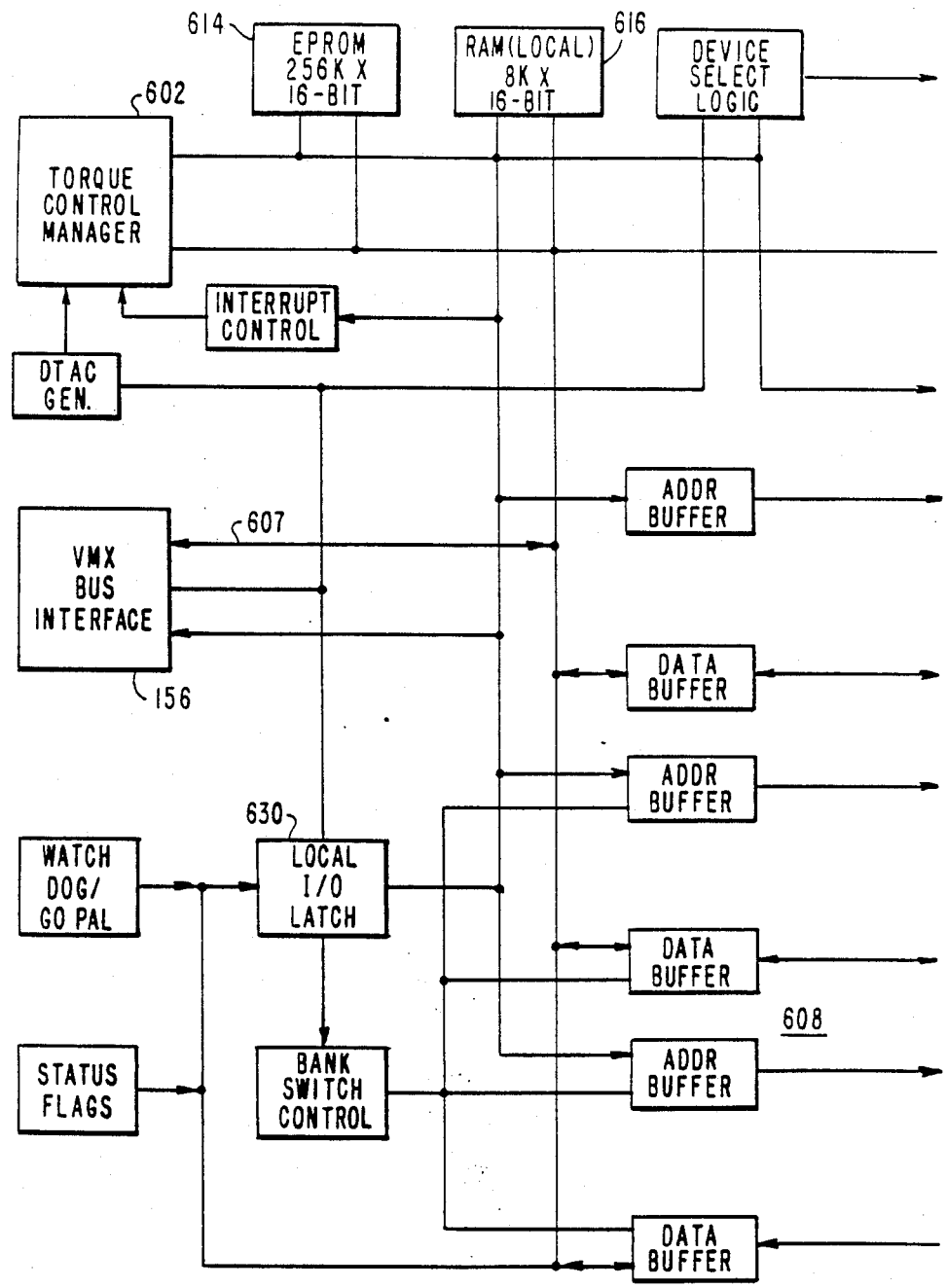
Figures 2, 6A:
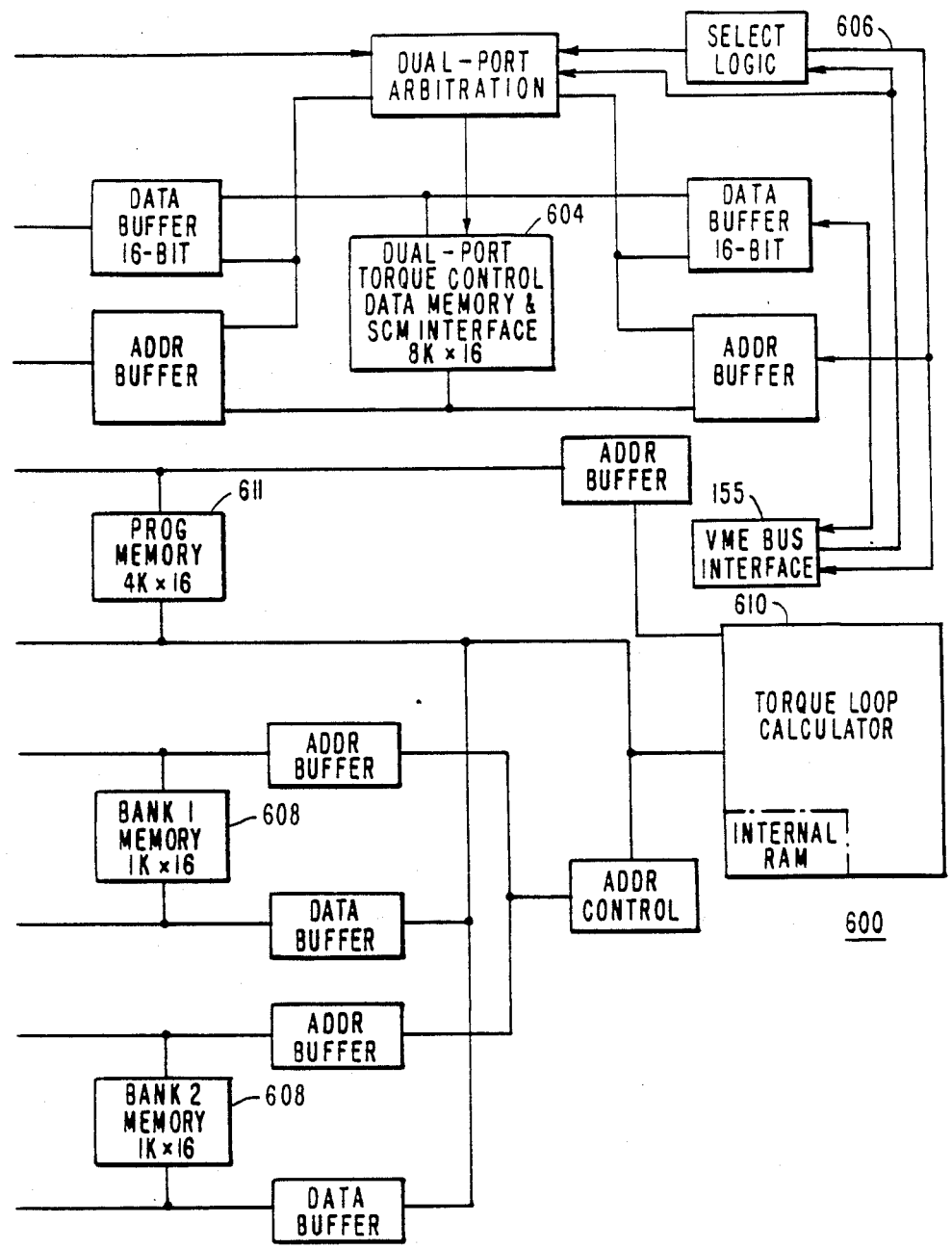

A flow chart for programming 650F used in the torque feedforward manager 602A is shown in FIG. 5.

A startup procedure 652F initializes conditions for program execution before actual robot motor is begun. Once initialization is completed, block 654F signals the torque estimator 610A that torque calculations can be made.

Block 656F then detects whether the then current 4 millisecond tick has been completed (8 4 ms ticks are included in each 32 ms cycle). At the end of each 4 ms 658F detects whether a set of feedforward torques has been calculated. Normally, the torque calculations require 2.9 ms for completion and thus would be ready by the end of each tick. If the torque calculations are not ready by the end of the tick, an error is flashed by block 660F.

If the torque calculations are ready, block 662F calls for the calculated torques to be sent through the ping-pong memory to the SCM board 400 under TF manager control, calls for actual joint force to be copied from the SCM board 300 to the torque estimator 610A, calls for execution of subroutine CMDTIC (in the torque estimator 610A) to update the position, velocity and acceleration commands by linear interpolation, and sets the torque estimator 610A to GO for the next tick in block 656F.

When the end of a cycle is reached as detected by block 664F (at which time a new SCM position command is available for the new cycle) i.e., after the last 4 ms tick in the 32 ms cycles time period, block 666F and 668F function like the blocks 658F and 662F except that block 668F calls for subroutine CMDEXT (executed in the torque estimator 610A) which sets up for the new interpolation calculations in the new cycle and generates by interpolation from the new SCM position command the position, velocity and acceleration commands for the first tick of the new cycle.

TORQUE ESTIMATOR—TORQUE FF ALGORITHM

Figure 4:
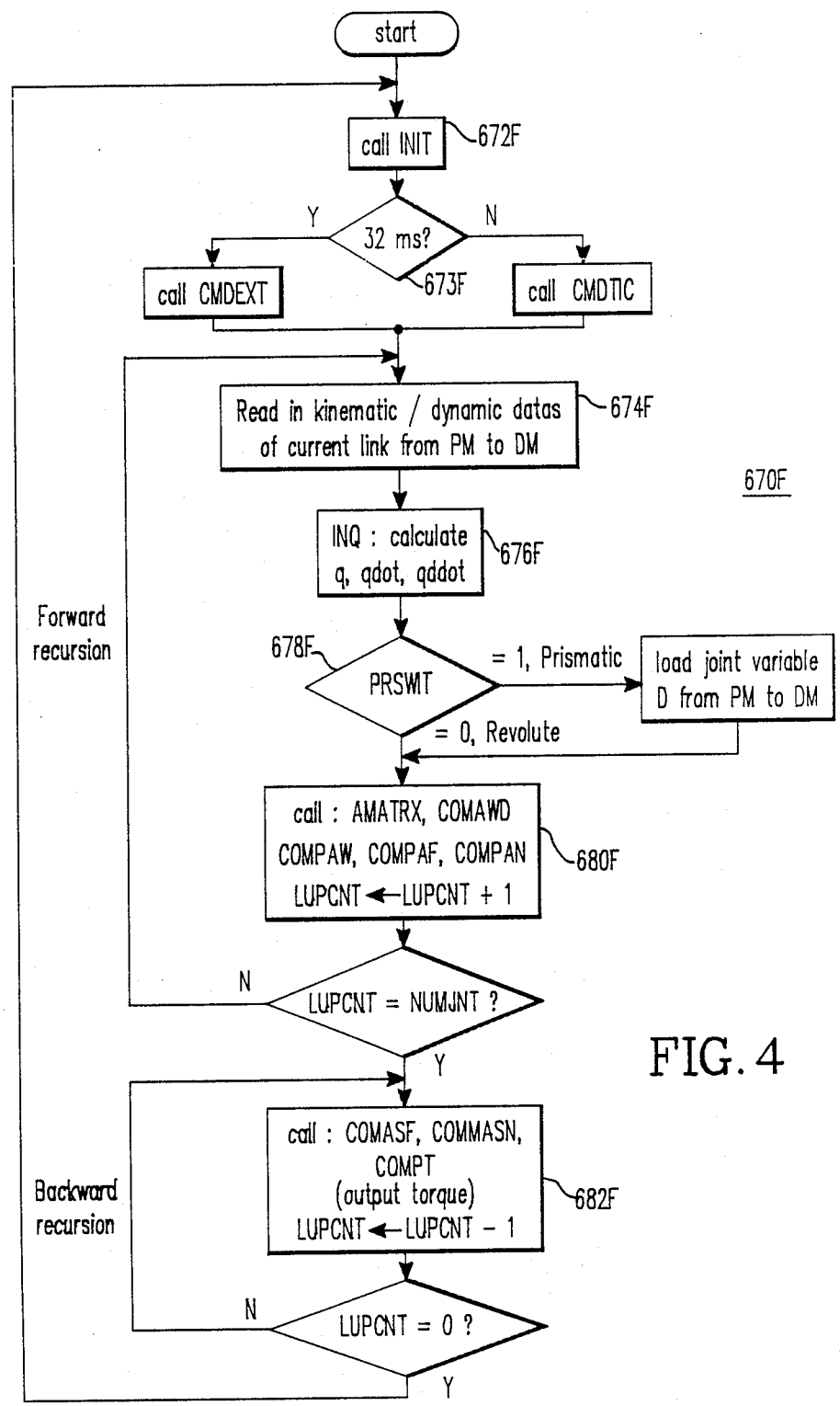
FIG. 4 shows flow charting for a torque calculating algorithm employed in the preferred embodiment.

A flow chart for the programming 670F used in the torque estimator 610A is shown in FIG. 4.

After initialization in block 672F to set up constants and memory space, etc., CMDEXT or CMDTIC is executed after being called in the TF manager 602A as previously described.

Next, block 674F obtains the stored kinematic/dynamic data for execution of the torque feedforward algorithm. The kinematic data includes joint offsets based on link length and twisting angle between adjacent links. The dynamic data includes joint inertia and center of mass of each link.

In block 676F, position (q) velocity (q dot) and acceleration (q d dot) are calculated by linear interpolation.

Block 678F next determines whether the joint being calculated is a prismatic or revolute joint and provide for use of the corresponding joint variable.

Algorithm routines are executed in block 680F as follows:

AMATRX—calculates transformation matrix from kinematic data.

COMAWD—calculates acceleration relative to world coordinates on the basis of q dot and q d dot.

COMPAW—calculates velocity of each link relative to world coordinates.

COMPAF—compute joint force based on dynamic data.

COMPAN—computes joint moment from joint force or basis of dynamic data.

After force and moment calculations have been completed for all joints through a forward recursion process from joint 1 to wrist joint 6, block 682F operates through a backward recursion from joint 6 to joint 1 to calculate actual joint output torques each of which is the sum of the joint load torque and the joint dynamic data torque. For this purpose, the following routes are executed:

COMASF—computes joint forces based on dynamic data and the force/moment feedback from the wrist force sensor.

COMMASN—computes joint moment base on dynamic data and the force/moment feedback from the wrist force sensor.

COMPT—computes final feed forward torque command under the condition of commanded position, velocity, acceleration, and force/moment feedback.

The resultant calculated torques for each joint represent the torques applied at the time of the calculations to produce the robot joint position velocity and acceleration then existing. After completion of a set of torque calculations, the program loops back for a repeat execution for the next tick.

CALCULATION OF DYNAMIC FEEDFORWARD TORQUE—MORE DETAIL

To implement a dynamic feedforward torque in the robot controller, the Newton-Euler formulation is implemented. With information for both the kinematic data and the dynamic data of each link of a manipulator, the torques needed to drive each joint are calculated by using the Newton-Euler dynamic equations under a specific set of position, velocity and acceleration commands. This approach, which is independent of the type of manipulator configuration, involves successive transformation of velocities and accelerations from the base of the manipulator out to the end effector, link by link, using the relationship of moving coordinate systems. Forces are then transformed back from the end effector to the base so that the torque at each joint is obtained. In order to achieve real-time calculation, a high speed signal processor is used (in this case, a TI TMS320). The average execution time of the Newton-Euler software is 2.9 ms.

Newton-Euler Dynamic Equations

The following equations are the Newton-Euler dynamic equations used to calculate feedforward torques. As can be observed from equations 1 to 3, the calculation differs according to the joint type of the manipulator. The Q format of each variable is also shown in the equations.

$$A^0_{i+1}\omega_{i+1} = \begin{cases} \underbrace{A^i_{i+1}(\underbrace{A^0_i\omega_i}_{Q_4} + \underbrace{z_0 q_{i+1}}_{Q_4})}_{Q_{12}} & \text{revolute} \\ \underbrace{A^i_{i+1}(\underbrace{A^0_i\omega_i}_{Q_4})}_{Q_{12}} & \text{prismatic} \end{cases} \quad 1.$$

$$A^0_{i+1}\dot{\omega}_{i+1} = \begin{cases} \underbrace{A^i_{i+1}[\underbrace{A^0_i\dot{\omega}_i}_{Q_4} + \underbrace{z_0 \dot{q}_{i+1}}_{Q_4} + \underbrace{(A^0_i\omega_i)}_{Q_4} \times \underbrace{(z_0 \dot{q}_{i+1})}_{Q_4}]}_{Q_{12}} & \text{revolute} \\ \underbrace{A^i_{i+1}(\underbrace{A^0_i\dot{\omega}_i}_{Q_4})}_{Q_{12}} & \text{prismatic} \end{cases} \quad 2.$$

$$\underbrace{A^0_{i+1}\dot{v}_{i+1}}_{Q_4} = \quad 3.$$

$$\begin{cases} \underbrace{(\underbrace{A^0_{i+1}\dot{\omega}_{i+1}}_{Q_4}) \times (\underbrace{A^0_{i+1}p^*_{i+1}}_{Q_4}) + \underbrace{A^i_{i+1}(\underbrace{A^0_i\dot{v}_i}_{Q_{12}})}_{Q_{12}\ Q_4}}_{Q_4} + \\ \underbrace{}_{Q_4} \\ \underbrace{(\underbrace{A^0_{i+1}\omega_{i+1}}_{Q_4}) \times [(\underbrace{A^0_{i+1}\omega_{i+1}}_{Q_4}) \times (\underbrace{A^0_{i+1}p^*_{i+1}}_{Q_{12}})] \text{revolute}}_{Q_4} \end{cases}$$

$$\begin{cases} (A_{i+1}^0 \dot{\omega}_{i+1}) \times \underbrace{(A_{i+1}^0 p_{i+1}^*)}_{Q_4} + \underbrace{A_{i+1}^i}_{Q_{12}} \underbrace{(A_i^0 \dot{v}_i}_{Q_4} + \underbrace{z_0 \ddot{q}_{i+1}}_{Q_4}) + \\ \underbrace{Q_4} \\ (A_{i+1}^0 \omega_{i+1}) \times [(A_{i+1}^0 \omega_{i+1}) \times (A_{i+1}^0 p_{i+1}^*)] + \\ \underbrace{Q_4}_{Q_4} \quad \underbrace{Q_4}_{Q_4} \quad \underbrace{Q_{12}}_{Q_4} \\ 2 \cdot \underbrace{(A_{i+1}^0 \omega_{i+1})}_{Q_4} \times \underbrace{(A_{i+1}^i \cdot z_0 \dot{q}_{i+1})}_{Q_4} \text{ prismatic} \\ \underbrace{Q_4}_{Q_4} \end{cases}$$

$$\underbrace{A_i^0 \hat{\dot{v}}_i}_{Q_4} = \underbrace{(A_i^0 \dot{\omega}_i)}_{Q_4} \times \underbrace{(A_i^0 \hat{S}_i)}_{Q_{12}} + \underbrace{(A_i^0 \omega_i)}_{Q_4} \times [\underbrace{(A_i^0 \omega_i)}_{Q_4} \times \underbrace{(A_i^0 \hat{S}_i)}_{Q_{12}}] + \underbrace{A_i^0 \dot{v}_i}_{Q_4}$$

$$\underbrace{A_i^0 F_i}_{Q_0, Q_8} = \underbrace{m_i}_{Q_8} \cdot \underbrace{A_i^0 \hat{\dot{v}}_i}_{Q_4} \quad Q_1$$

$$\underbrace{A_i^0 N_i}_{Q_0, Q_8} = \underbrace{(A_i^0 J_i A_0^i)}_{Q_8} \underbrace{(A_i^0 \dot{\omega}_i)}_{Q_4} + \underbrace{(A_i^0 \omega_i)}_{Q_4} \times [\underbrace{(A_i^0 J_i A_0^i)}_{Q_8} \underbrace{(A_i^0 \omega_i)}_{Q_4}]$$

$$\underbrace{A_i^0 f_i}_{Q_0, Q_8} = \underbrace{A_i^{i+1}}_{Q_{12}} \underbrace{(A_{i+1}^0 f_{i+1})}_{Q_0, Q_8} + \underbrace{A_i^0 F_i}_{Q_0, Q_8}$$

$$\underbrace{A_i^0 n_i}_{Q_0, Q_8} = \underbrace{A_i^{i+1}}_{Q_{12}} [\underbrace{A_{i+1}^0 n_{i+1}}_{Q_0, Q_8} + \underbrace{[A_{i+1}^i \cdot (A_i^0 p_i^*)]}_{Q_{12}} \times \underbrace{(A_{i+1}^0 f_{i+1})}_{Q_0, Q_8}] +$$

$$\underbrace{(A_i^0 p_i^* + A_i^0 \hat{S}_i)}_{Q_{12}} \times \underbrace{(A_i^0 F_i)}_{Q_0, Q_8} + \underbrace{A_i^0 N_i}_{Q_0, Q_8}$$

$$\tau_i = \begin{cases} \underbrace{(A_i^0 n_i)^T}_{Q_0, Q_8} \underbrace{(A_i^{i-1} z_0)}_{Q_{12}} & \text{revolute} \\ \underbrace{(A_i^0 f_i)^T}_{Q_0, Q_8} \underbrace{(A_i^{i-1} z_0)}_{Q_{12}} & \text{prismatic} \end{cases}$$

where $$A_{i-1}^i = \begin{bmatrix} \cos\theta_i & -\cos\alpha_i \sin\theta_i & \sin\alpha_i \sin\theta_1 \\ \sin\theta_i & \cos\alpha_i \cos\theta_1 & -\sin\alpha_i \cos\theta_i \\ 0 & \sin\alpha_i & \cos\alpha_i \end{bmatrix}$$

$$A_i^0 p_i^* = \begin{bmatrix} a_i \\ d_i \sin\alpha_i \\ d_i \cos\alpha_i \end{bmatrix}$$

$$A_0^i = A_0^{1*} A_1^{2*} \ldots * A_{i-1}^i$$

$$(A_{i-1}^i)^{-1} = (A_{i-1}^i)^T = A_i^{i-1}$$

the given constants are
n = number of joints (i.e., n+1 links), $\omega_0 = \dot{\omega}_0 = 0$, and $v_0 = 0$ $$Z_0 = \begin{bmatrix} 0 \\ 0 \\ 1 \end{bmatrix}, \quad v_0 = \begin{bmatrix} 0 \\ 0 \\ 9.80621 \text{ meter/sec}^2 \end{bmatrix}$$

and $A_i^0 J_i A_0^i$: the moment of inertia matrix of link i about its center of mass referred to its own coordinate.
$A_i^0 \hat{S}_i$: the center of mass of link i referred to its own coordinate.
$m_i$: total mass of link i, a scalar.
$\hat{v}_i$: linear velocity of the center of mass of link i.
$F_i$: total external vector force exerted on link i.
$N_i$: total external vector moment exerted on link i.
$f_i$: vector force exerted on link i by link i−1.
$n_i$: vector moment exerted on link i by link i−1.

Note that, for a manipulator with n joints and n+1 links, $f_{n+1}$ and $n_{n+1}$ are the forces and moments exerted by the hand (i.e., link n) upon an external object.

The Q format of each variable in the above equations is the format used to develop the TMS Newton-Euler software. Since the calculation of the TMS320 is carried out in a fixed point manner, the Q format will define the location of the binary point for each variable in the Newton-Euler dynamic equations. Note that the variables $A_i^0 F_i$, $A_i^0 N_i$, $A_i^0 f_i$, $A_i^0 n_i$ and $\tau_i$ all have two kinds of format. This is necessary since the torques needed to drive the minor joints (joint 4,5,6) are small, so Q8 format is used. The torques needed to drive the major joints (joint 1,2,3) are large, so Q0 format is used. Because the Newton-Euler dynamic equations require both forward and backward recursions in calculation torques, appropriate format changes are made between major joints and minor joints during the recursions.

Flowchart For Newton-Euler Algorithm

The previously considered flow chart in FIG. 4 shows how the Newton-Euler dynamic equations work. In the flow chart, the capitalized words represent the subroutines implemented to calculate the appropriate intermediate data in the Newton-Euler dynamic equations. A brief description of each of these subroutines follows:

INIT: Sets up the TMS320 run time environment, clears necessary data memory location for next cycle of calculation of the dynamic feedforward.

CMDEXT: Calculates velocity and acceleration commands of all six joints in a new 32 ms cycle * by using previous and present position commands of the manipulator.

CMDTIC: Maintains and updates the position, velocity and acceleration commands of all six joints in the present 32 ms cycle.

INQ: Converts the joint commands to proper unit so that they can be fed into the Newton-Euler software.

AMATRX: Calculates the transformation matrix $A_{i-1}^i$, i=1 to 6, from link i−1 to link i.

*(In the trajectory planner of the VAL controller, only position command of each joint of the manipulator are updated every 32 millisecond.)

Subroutines COMAWD, COMPAW, COMPAF, COMPAN, COMMASN, COMASF and COMPT compute $A_i^0\omega_i$, $A_i^0\dot{\omega}_i$, $A_i^0F_i$, $A_i^0N_i$, $A_i^0f_i$, $A_i^0n_i$, $\tau_1$, respectively, i=1 to 6. The torque values will be output from the COMPT subroutine.

Since the execution time for the program is approximately 2.9 ms, the position command of each joint of the robot is generated every 32 ms, and the VAL servo is done in a 1 ms period, incorporation of the dynamic feedforward into the VAL controller is achieved by outputting the feedforward torques every 4 ms.

In the torque estimator flow chart, box 673F makes a cycle end check. The TMS software checks a memory location 'CHK32' to see if the current 32 ms cycle is over. If it is, a set of new position commands is obtained from the VAL controller, and a set of new velocity commands and acceleration commands are calculated by the subroutine CMDEXT for the next 32 ms period. If the present 32 ms period is not ended, the subroutine CMDTIC holds the velocity and acceleration commands of the present cycle, and calculates the positions and velocities for all joints accordingly as cycle time advances. The joint acceleration commands within a 32 ms period stay the same.

A variable 'NUMJNT' specifies the total number of joints of the manipulator. Both the forward recursion and the backward recursion loop n times for an n joint manipulator to calculate a set of joint torques. After the start of the program 670F, the operation stops at box 673F and waits for the TM manager 602A to activate the torque estimator 610A. The BIO pin of the TMS320 processor is properly connected to the 68000 processor so that when the 68000 processor puts the BIO pin in the active state (active low), the Newton-Euler algorithm in the program 670F is activated. After the completion of calculating the dynamic feedforward, the TMS320 notifies the 68000 that the operation is done and the BIO pin is held high by the 68000 so that the TMS320 stops processing. The TMS320 thus is put into a wait space until the 68000 activates it again to start another cycle of torque calculations. Operation of the two processors is thus synchronized.

Input Command Extraction

In calculating the dynamic feedforward for each joint of a manipulator, the knowledge of position, velocity and acceleration commands for each joint is essential.

In the trajectory planning, only the position commands are updated in a 32 ms cycle. Thus, the velocity and acceleration commands are derived by using the previous and present position commands and the cycle time. From the velocity and acceleration profiles, the best way to calculate velocity and acceleration is to use linear interpolation, i.e., velocity=(new position-old position)/cycle time acceleration=(new velocity-old velocity)/cycle time During each 32 ms cycle, the acceleration of each link remains the same and the velocity profile exhibits a linear relationship with time. For accuracy, the velocity (position increment or decrement) is calculated in the unit of bits per 1 ms so that during the 32 ms cycle the velocity can be incremented or decremented to the desired value which is calculated by the linear interpolation. The advantage of carrying out a linear interpolation is obvious in that, instead of a great jump in velocity every 32 ms, we will be able to approximate a linear characteristic of a velocity profile by incrementing or decrementing small jumps in velocity 32 times during a 32 ms cycle. This is also true for the case of calculating the intermediate position commands for each joint in the 32 ms cycle.

The unit of position command supplied by the VAL controller is in 'bits', which is a direct read out from the optical encoder at each joint of the manipulator. Consequently, the unit of velocity and acceleration will be in 'bits/ms' and 'bits/ms$^2$', respectively. But in the Newton-Euler dynamic equations, in order to calculate torques, the unit of velocity as well as the unit of acceleration must be converted into 'rad/sec' and 'rad/sec$^2$'. Therefore, proper conversion procedures that convert different units must be performed on the position, velocity and acceleration commands before the Newton-Euler software can be executed.

Output Torque Conversion

The torques calculated by Newton-Euler dynamic equations are the torques required to move the arm along a defined trajectory under specific position, velocity and acceleration commands. In order to drive the motor at each joint of the arm, the torques calculated by the Newton-Euler dynamic equations must be converted back through the gear train at each joint to obtain proper motor torque values.

The relationship between the input torque and the output torque through a gear train is:

$$T_1 = T_2 \div \left(\frac{n_2}{n_1}\right)$$

where $T_1$: torque applied to the input shaft.

$T_2$: torque transmitted to the output shaft.

$n_1, n_2$: number of teeth on gear 1 and gear 2, respectively.

$n_2/n_1$: gear ratio.

Here, the torque of each joint calculated by the Newton-Euler dynamic equations corresponds to $T_2$ in the above equation, i.e., the torque at the output shaft of each joint that drives the manipulator. The output torques calculated by Newton-Euler dynamic equations divided by overall gear ratio of each joint will compose the set of proper torque values to drive the motor at each joint of the manipulator.

Accuracy of Calculated Feedforward Torque

Since the data storage unit of the TMS320 is a word (16 bits) and the mathematical operations are carried out in the fixed point manner, in order to get a relatively accurate result, appropriate format selection must be made of each of the variables in the Newton-Euler dynamic equations. A high level simulation program of the Newton-Euler dynamic equations written in C language can be employed to calculate the ideal torque values of each joint of a manipulator under specific position, velocity and acceleration commands. The torques calculated by using TMS320 code are then compared with the ideal values to ensure that the errors are within a certain percent, such as 5 percent, of the ideal values. This can be achieved by choosing the proper Q format for the variables in the Newton-Euler dynamic equations.

Advantages of Dynamic Feedforward

The most commonly used controller in commercial robots is the PID controller. Usually, if the system is to have a fast response, the system gain can be increased. However, overshoot may be increased or an unstable system may result. For a manipulator working in a constraint environment, overshoots may cause damage to parts in an assembly or even damage to the robot arm itself. To avoid overshoots, the dynamic feedforward may be used together with a PID controller that has a low system gain. By reducing the feedback gain of the controller, the manipulator is more compliant to the environment. However, with reduced gain, large trajectory errors may occur. Here, if the accurate dynamics of the manipulator is known and correct feedforward terms are calculated, feedback errors can be reduced and the trajectory tracking ability of the manipulator is improved. Therefore, the position errors are reduced significantly. In the hybrid controller, if the manipulator is moving in a free space, pure position control can be used. If the manipulator is working in the constraint space, the selection matrix [S] chooses the proper degree of freedom for position servos and a switch degree of freedom for force servos which need more compliant motion.

Figure 13A:
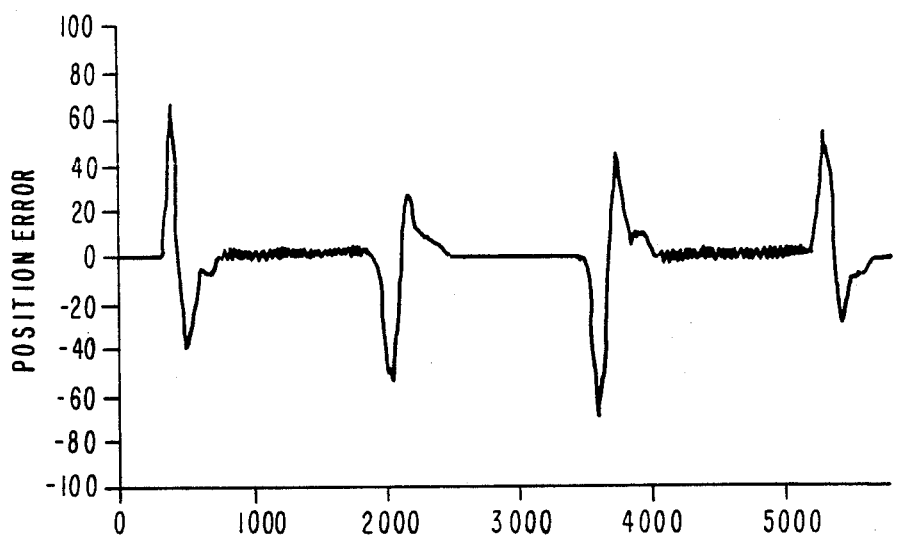
FIG. 13A illustrates the path accuracy of a typical prior art robot control by means of a time plot of position error produced by the prior art control as it implements the velocity command of FIG. 12.
Figure 13B:
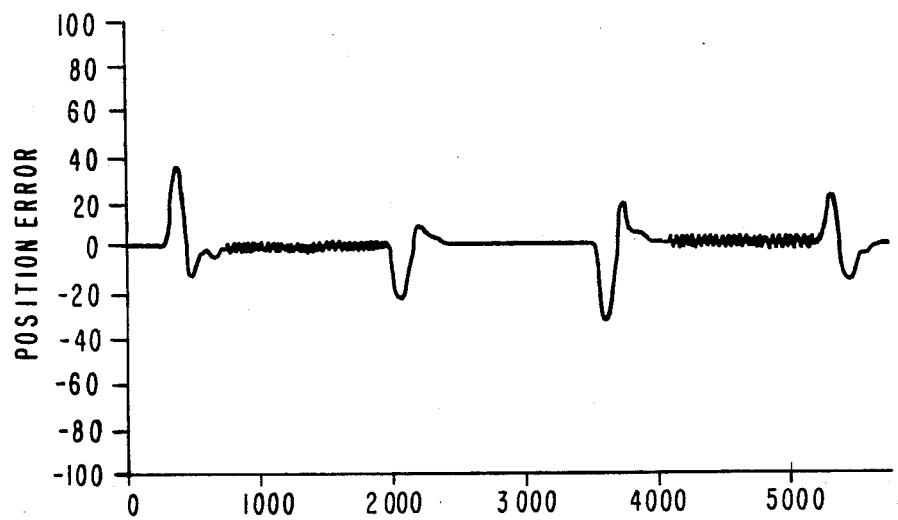
FIG. 13B illustrates the improved accuracy achievable with the robot control of the present invention as it implements the velocity command of FIG. 12.
Figure 14A:
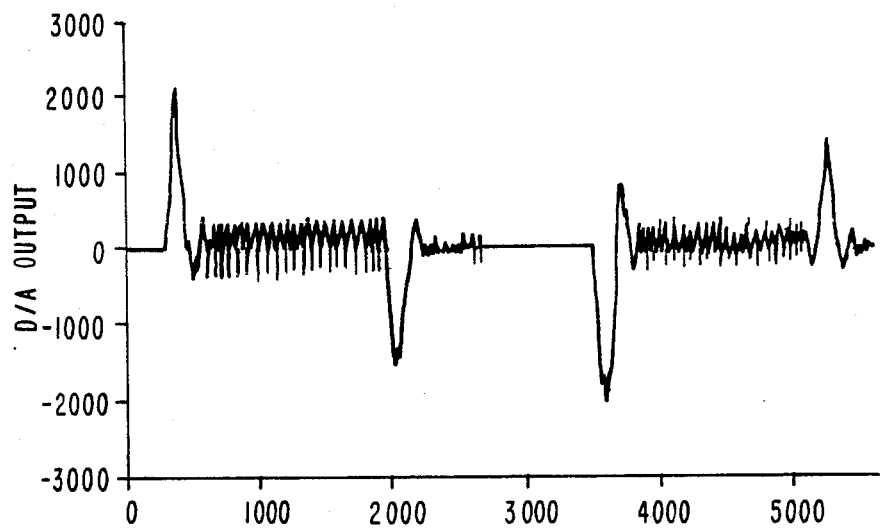
FIGS. 14A and 14B show the output robot drive signals corresponding respectively to the position error signals of FIGS. 13A and 13B.
Figure 14B:
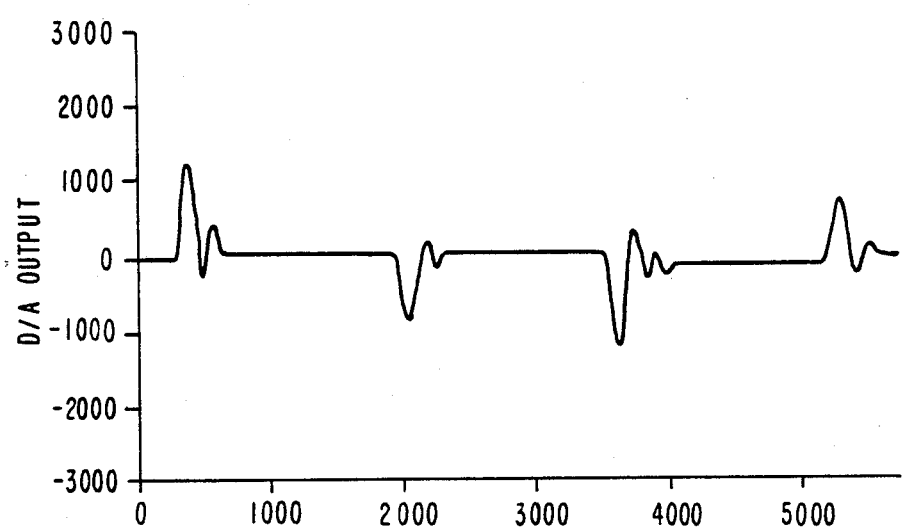

Reference is made to FIGS. 13B and 14B which clearly show the improved response achieved with use of the invention as compared to the prior art in FIGS. 13A and 14A.

FORCE SENSOR

General Force Sensing Techniques

Existing force sensing devices can generally be classified into three categories according to their placement relative to the manipulator. Force sensing devices are normally mounted (1) on the joints of the manipulator, (2) on or near the manipulator hand, (3) on the support platform for the object to be handled. Within each of the categories, individual mechanical implementations vary a great deal.

A JR$^3$ Universal Force Sensor is employed in this case. It belongs to category two and is mounted on the wrist of a manipulator. Wrist type force sensors, share in common the potential to sense small hand forces and moments on the order of a few hundredths of a newton. Furthermore, since the conversion from sensor readings to hand forces and moments in a function of only the construction and geometry of the sensing device, most of these sensors have been designed to enable use simple conversion routines.

Since most wrist force sensors function as transducers for transforming forces and moments exerted at the hand into measurable displacements at the wrist, it is important that the wrist motions generated by the force sensor not diminish the position accuracy of the manipulator. So, the typical wrist force sensors should exhibit the following characteristics:

(1) High stiffness: ensures that the frequency response of the wrist is such that disturbing forces are quickly damped. It also reduces the magnitude of the deflections for an applied force or moment and thus, preserves the position accuracy of the manipulator.

(2) Compact design: since it is desirable to measure as large a hand force as possible, minimizing the distance between the hand and the wrist force sensor reduces the lever arm for force applied at the hand. Also, the overall dimensions of the wrist are kept small to ensure that this device does not restrict the movement of the manipulator in a constraint space.

(3) Good linearity: if the response of the force sensing device is linear, with respect to applied forces and moments, it permits the resolution of sensor readings by using simple matrix operations.

(4) Low hysteresis and internal friction: internal friction reduces the sensitivity of the force sensing device since force must first overcome friction before a measurable displacement can be produced. Internal friction produces a hysteresis effect so that the operation of applying and subsequently removing the same force does not restore the position measuring devices to their original readings.

JR$^3$ Universal Force Sensor (UFS) System

The JR$^3$ wrist force sensor system primarily consists of two components:

(1) A compact monolithic sensor, capable of measuring all six degrees of freedom of load components. The full load ratings of the JR$^3$ UFS system is shown in the following table:

| Force Component | Load Rating |
| --- | --- |
| $F_x$ | 25 lb |
| $F_y$ | 25 lb |
| $F_z$ | 50 lb |
| $M_x$ | 75 in-lb |
| $M_y$ | 75 in-lb |
| $M_z$ | 75 in-lb |

Table 1—Full load ratings of the JR$^3$ UFS system where $F_x$, $F_y$, $F_z$ are the load ratings of force along the x, y, z axes, respectively, and $M_x$, $M_y$, $M_z$ are the load ratings of moment about the x, y, z axes, respectively.

(2) An intelligent support system which contains a signal conditioning board, an A/D converter board, and a VLSI processor board (Intel 80188 based) that translates sensor data and interacts with the host computer.

The sensor responses are distinguished into two types of data: one is called raw data, and the other is called processed data.

Raw data is the direct sensor reading from A/D conversion without any digital filtering, cross sensitivity removal, toolframe coordinate transform, or offset removal. The data figures (whether displayed in hexadecimal, decimal or binary format) are the number of counts out of the full range of ±2048 counts (12 bits, which correspond to the full scale loading of each channel shown in Table 1). A sensor reading of +2048 or −2084 counts on a particular channel indicates that the 12 bit A/D is saturated on that channel and the data will not reflect the actual loading.

Processed data is the sensor data after digital filtering, cross sensitivity removal, toolframe coordinate transform, and offset removal. The data can be displayed in hexadecimal, decimal, binary counts; or in engineering units, which is in the unit 'lb' or 'in-lb'. To display both the raw data and the processed data, the sensor command 'DR' (Display Raw data) and 'DP' (Display Processed data) can be used, respectively.

As described in the sensor user's manual, the sensor raw data will be filtered by the 4th order Butterworth lowpass filter which is available for each channel, to help minimize noise. The sensor raw data is calibrated by a 6×6 calibration matrix (also called cross sensitivity matrix) which is held in the UFS system memory, to remove the cross coupling effects between all six channels. Note that the loading data output of the sensor system is measured in the coordinate system (known as the toolframe coordinate) where the origin is located at the center of the top face of the sensor with the z axis being perpendicular to the face of the sensor. In order to determine x and y axes of the toolframe coordinate, a simple experiment can be performed. Put a certain load to the sensor and hold it in such a way that the z axis is parallel to the ground. At this point, the sensor load reading of force component along z axis is approximately zero. Now, slowly rotate the sensor about z axis and check the force components of both x and y axes. When the reading of force component along y axis reaches zero and the reading of force component along x axis is some positive figure, the x axis is the vector pointing from the original of the toolframe coordinate to the ground. Y axis is also determined in a similar manner.

The analog output port of the JR$^3$ UFS system is connected to an analog data Module ADM 23 (FIG. 3) which interfaces with the SCM board 400. The sensor responses are sampled by the ADM at a frequency specified interactively by the user. In the UFS, the sensor signals are digitized in the UFS, cross coupling is removed, and data are converted back into analog and then output through the analog port. The data sampled by the ADM have this been decoupled, but to obtain actual loadings (processed data) of the sensor, offset must be appropriately compensated.

Offsets are applied to the new sensor load readings to compensate for the tare weight of the sensor or even the end effector which may be mounted on the sensor. Offsets can be used to remove various kinds of drift and can also be used to 'zero' the sensor output data. The sensor command 'DO' can be used to display the offsets in decimal format. When an external load is present, the offsets are subtracted from the raw sensor load readings so that the actual loadings caused by the external load can be obtained.

For example, when the sensor and an end effector mounted to joint 6 of a manipulator, the sensor command 'RO' (Reset current Offsets to current sensor raw data readings) can be used. The command causes the sensor system to take the raw sensor load readings (at the time of entering the command) and use those figures as the new offsets. By subtracting the offsets from the present raw sensor load readings, the sensor system data output will be approximately zero. The new offsets contain the load readings caused by the tare weight of both the sensor and the end effector. After an object has been picked up by the end effector or external forces and moments are detected, the actual loadings (processed sensor data) will be the raw sensor load readings subtracted by the offset of each channel. Then, the processed data will represent the load components that the external forces and moments have imposed onto the manipulator.

Force/Moment Transformation

The following explains why the sensor load readings are transformed into different coordinate systems.

Transformation to Joint 6 Coordinate

The sensor's toolframe coordinate is located at the center of the sensor's top face, and the sensor load readings are measured with respect to this coordinate. In order to feed the external load data into the Newton-Euler algorithm properly, certain steps must be taken. In the Newton-Euler algorithm, for a six joint manipulator, $f_7$ and $n_7$ correspond to the external forces and moments acting to the center of mass of joint 6. These forces and moments should be measured in the joint 6 coordinate system. Therefore, a force/moment transformation from the sensor's toolframe coordinate to the joint 6 coordinate is appropriately made. The robot is set forth herein, which simplifies the force/moment transformation between the two coordinates considerably:

(1) Mount the JR$^3$ UFS system to joint 6 of PUMA 560 such that the x, y axes of both coordinates are colinear and both the z axes coincide.

(2) Put the PUMA 560 in the 'READY' position and invoke the sensor command 'RO' to get a new set of offsets.

(3) Consider the sensor as a part of joint 6 and then recalculate the center of mass, moment of inertia matrix and the mass of joint 6. Use these data as the new dynamic data of joint 6, which will be used in the Newton-Euler algorithm. Since the force sensor has a fairly symmetric geometry, the new dynamic data for joint 6 will not be difficult to calculate.

(4) Mount the end effector in the same manner as in step 1. Now, the sensor load readings referred to the sensor's toolframe coordinate will reflect the loadings of both the end effector and whatever the external load that might be picked up by the end effector.

(5) The simple formulas of force and moment transformation shown as follows will serve the purpose:

$$j^6 M_x = n \cdot ((^{tf}F \times p) + {}^{tf}M)$$
$$j^6 M_y = o \cdot ((^{tf}F \times p) + {}^{tf}M)$$
$$j^6 M_z = a \cdot ((^{tf}F \times p) + {}^{tf}M)$$
$$j^6 F_x = n \cdot {}^{tf}F$$
$$j^6 F_y = o \cdot {}^{tf}F$$
$$j^6 F_z = a \cdot {}^{tf}F$$

and the transformation matrix T from the sensor's toolframe coordinate to the joint 6 coordinate is:

$$T = [n\ o\ a\ p] = \begin{bmatrix} 1 & 0 & 0 & 0 \\ 0 & 1 & 0 & 0 \\ 0 & 0 & 1 & D \\ 0 & 0 & 0 & 1 \end{bmatrix}$$

where
D is the distance from the origin of the sensor's toolframe coordinate to the origin of the joint 6 coordinate.
$^{tf}F$ and $^{tf}M$ are the force and moment vectors measured by the sensor in the toolframe coordinate.
$^{j6}F$ and $^{j6}M$ are the force and moment vectors calculated in the joint 6 coordinate.

By using the above procedures, the external forces ($^{j6}F$) and moments ($^{j6}M$) can then be fed into the Newton-Euler algorithm, and the joint torques can be calculated accordingly.

In the above procedures, the sensor load readings will reflect not only the loading effect caused by the external load, but also the loading effect caused by the end effector. To improve this, we can reverse step 2 and step 4 in the above procedures. After invoking the sensor command 'RO', the new set of offsets will contain the loading caused by both the force sensor and the end effector. Therefore, the processed sensor load readings will only reflect the external load. But this way, the end effector together with the force sensor should also be regarded as a part of joint 6. Due to the reason that the shape of the end effector may vary during an operation, for example, close a gripper or open a gripper, so the dynamic data of joint 6 may change and thus, is difficult to calculate. However, if the shape of the end effector doesn't change during an operation, this method does have the advantage that the sensor will only reflect the loadings caused by the external load, which is especially important when the manipulator is working in a constraint environment.

Joint Torque Transformation

The basic idea of calculating the joint torques resulted from the force sensor load readings is to prove that, the torque difference of each joint calculated by Newton-Euler algorithm with and without external forces and moments must be equal to the torque values directly calculated by converting the sensor load readings to each joint. In another word, while no external load is present, the sensor should actually give zero readings, and a set of joint torques can be calculated by using Newton-Euler algorithm. If the external load is present, then by feeding the $f_7$ and $n_7$ (external force and moment measured by the sensor) into the Newton-Euler algorithm under the same position, velocity and acceleration commands, a new set of joint torques is obtained. Thus, the difference between the two sets of joint torques can be viewed as a set of 'extra' torques needed for each joint to handle the external loading. This set of 'extra' torques must be equal to the sensor readings multiplied by the Jacobian transpose of the manipulator.

The simple transformation relation is shown in the following equation:

$$F = J^T\ ^{j6}F$$

where
F is the 6×1 joint torque vector.
$^{j6}F$ is the 6×1 external force/moment w.r.t. the joint 6 coordinate.
$J^T$ is the Jacobian transpose matrix of the manipulator.

Transformation to Cartesian Coordinate

The desired force and moment trajectories are specified in the Cartesian space. Since the force sensor load readings are referred to its own toolframe coordinate, force transformation from the toolframe coordinate to the Cartesian coordinate must be done in order for the proper feedback of the sensor information. Formulas like those previously described can be used to perform the transformation except that, the transformation matrix T is shown as follows:

$$T = (BASE * T_6 * SENSOR)^{-1}$$

$$T_6 = A_1 * A_2 * A_3 * A_4 * A_5 * A_6$$

where
BASE is the transformation matrix from the base of the manipulator (i.e., Cartesian coordinate) to the joint 1 coordinate.
SENSOR is the transformation matrix from the joint 6 coordinate to the toolframe coordinate of the force sensor.
$A_i$ is the transformation matrix from link $i-1$ to link $i$, and thus, $T_6$ will be the transformation matrix from the joint 1 coordinate to the joint 6 coordinate.

The transformation matrix T transforms the coordinate system from the toolframe coordinate of the force sensor to the base of the manipulator. Therefore, after the force and moment readings of the force sensor has been transformed, the sensor information can be properly fed into the hybrid controller.

FEEDFORWARD TORQUE PROCESSOR (FFTP) BOARD—MORE DETAIL

The processors used on the FFTP board, as on the basic TP board, are the Motorola 68000 (68k, 16 bit microprocessor operating at 10.0 Mhz system clock frequency), and the TI TMS320 signal processor serving as a co-processor for performing high speed (200 nano-second per instruction cycle) fixed point mathematical calculations.

Upon power up of the servo system, the FFTP module receives parameter set up commands from the SCM. It also checks whether the servo is enabled. Since the FFTP module is mainly used to calculate feedfoward torques, it expects position commands from the SCM every 32 ms. In return, the feedforward torques are sent back to the SCM in 4 ms intervals for summing with position and velocity error based torque commands and implementation in the basic torque control. If the IP module is not enabled, it sends out zero output.

Memory Organization

In the torque processor module, the memory is divided into several parts which consists of local processor EPROM, local RAM(LR), shared RAM(SR), TMS Ping-Pong RAM and TMS program RAM. The addresses are shown as follows:

| | | |
|---|---|---|
| >00000 | >07FFF | Local processor (referred to 68k) EPROM, consists of 68k shell code and TMS Newton-Euler code. |
| >34000 | >37FFF | Shared RAM, which 68k of the TP module can have access to, also SCM can gain access to this memory through VME bus. |
| >38000 | >3BFFF | Local RAM, which is dedicated to the 68k of the TP module. |
| >3C000 | >3C3FF | Ping-Pong RAM (two banks), where both 68k and the TMS320 can gain access to. |
| >40000 | >41FFF | TMS program memory. A block of RAM, which is dedicated to the TMS 320, to hold the TMS source code. |

The contents of the TMS320 program memory, 4k by 16-bit, must be downloaded by 68k before TMS can be allowed to begin program execution. Access to the TMS320 program memory by the 68k is only allowed when the TMS320 is being held reset. The 68k can force the TMS320 to the reset by writing a 0 to location >7EA01. Writing a 1 to >7EA01 will release the TMS320 from reset state.

Interfacing is provided as follows:

Interface Between FFTP and SCM

The torque processor is a slave module on the VME bus to perform digital torque loop calculation. All interfacing to the higher level controller (i.e., the Servo Core Module) are provided through shared RAM, which is resident within the TP module. In operation, the torque processor receives position commands and then provides output torques and status information via shared RAM to the SCM. The memory mapping for handshaking flags with the SCM in the shared RAM will be described subsequently.

Ping-Pong Memory

The primary interface for interchange of information between the TMS320 and the 68,000 on the TP module is provided by bank switched memory (also referred to as Ping-Pong memory). The bank switched memory consists of two identical, physically separate, 1K by 16-bit RAM arrays. These arrays are referred to as banks. Both banks are resident within the same address space. At any given point in time, ownership of one of the memory banks is associated with the 68k and the ownership of the other bank is associated with TMS320. Since the memory appears as a single 1K by 16-bit RAM, access to the memory by either processor is totally transparent to operations by the other processor.

There are four states associated with the 68k to TMS320 interface. These states are referred to as idle, go, processing and done. Assertion of the TMS320 reset signal forces the interface to be in the idle state. The interface will remain in the idle state until the go state is requested by the 68k. Bank switching can only be effected while the interface is in the idle state.

In operation, the 68k will write information consisting of commands and data to the bank memory, request a bank switch, and set the go state. Switching of the bank makes this information available to the TMS320. The TMS320 detects go state, sets the processing state, and operates on the data, writing the results back into the bank memory. Concurrently, the 68k can write to the other bank memory with the next set of commands and data transparent to the TMS320 operation. The TMS320 will set the done state upon completion of the required processing. The 68k detects the done state, forces the idle state, and switches the banks to obtain access to the results of the TMS320 calculations.

The TMS320 BI0 pin and I/O port PA3 are associated with the handshake interface with the 68k. The 68k request the go state by outputting a XXX1 to address >7EA07. This activates the TMS320. The TMS320 acknowledges by setting the processing state which is done by outputting a data value of XXX1 to I/O port 3. After completion of the required processing the TMS320 sets the done state by outputting a XXX2 to address >7EA07.

The Ping-Pong memory address viewed from the 68k starts from location >3C000 to >3C3FF, and the Ping-Pong memory address viewed from the TMS320 starts from location 0 to >1FF (in word). In order for the TMS320 to access the Ping-Pong memory, the starting address has to be output through the I/O port PA0 on the TMS320 first; then the following data whether read or write will be input or output via I/O port PA1 or PA2. If the I/O operation is done through port PA1, the address will be auto-incremented by the address counter resident within the TP board. On the other hand, if the I/O operation is done through port PA2, the address will be auto-decremented.

Memory Mapping—Handshaking Flags

The memory mapping of the shared RAM is shown as follows:

| Address | Signal | Size | Description |
|---|---|---|---|
| >34000 | FFBRD | word | FF board ID (which equals >4646) |
| >34002 | BDGO | byte | FF board go status. 1: go; 0: idle. |
| >34003 | BDINIT | byte | Board initialization identification. 1: initialization done; 0: not done yet. |
| >34004 | BDMODE | word | Board mode. 1: RUN mode; 0: DIAGNOSTIC mode. |
| >34006 | FF.ERROR | word | Board error report. Normally remains 0 if no error occurs. |
| >34008 | FF.ERPTR | long word | Address pointer which points to the location where error occurs. |
| >34010 | SEMA1 | byte | Semaphore 1 which indicates a new set of position commands is ready. |
| >34011 | SEMA2 | byte | Semaphore 2 which indicates a new set of external forces and moments is ready. |
| >34012 | SEMA3 | byte | Semaphore 3 which indicates the torques calculated by Newton-Euler dynamic equations are ready. |
| >34013 | SEMA4 | byte | Semaphore 4 which indicates that a 'COMMAND' is ready. |
| >34014 | COMMAND | word | Command ID code. bit 1 to bit 15 are not used presently. |

-continued

| Address | Signal | Size | Description |
|---|---|---|---|
| | | | bit 0:1 → initial position commands ready. |
| | | | 0 → initial position commands not ready. |
| >34020 | SRJT | | Starting address of new position command. |
| >34070 | SRFM | | Starting address of external force and moment. |
| >34090 | SRTQ | | Starting address of torque output. |
| >340B0 | SRPVA | | Starting address of old position, velocity and acceleration. |
| >34170 | SRDA | | Starting address of diagnostic data. |

The memory mapping of the locl RAM is shown as follows:

| Address | Signal | Size | Description |
|---|---|---|---|
| >38000 | BANK | byte | Switch to select Ping-Pong RAM bank 0 or 1 |
| >38001 | CLOCK | byte | Clock to keep track of 4 ms. |
| >38002 | VCLOCK | byte | Clock to keep track of 32 ms. |
| >38004 | LCUNEX | word | Unexpected process code reporting area. |
| >38006 | UNCD | word | Process code when error occurs. |
| >38008 | UNSR | word | Status register for unexpected process. |
| >3800A | UNPC | long word | Program counter for unexpected process. |
| >38010 | UNACA | long word | Access address for unexpected process. |
| >38014 | UNIR | word | Instruction register for unexpected process. |

The memory mapping of the Ping-Pong RAM is shown as follows:

| Address | Signal | Description |
|---|---|---|
| >3C000 | CHK32 | Check point to see if a 32 ms cycle is over. |
| >3C010 | TMSJT | Starting address of new position command. |
| >3C060 | TMSFM | Starting address of external force and moment. |
| >3C080 | TMSTQ | Starting address of torque output. |
| >3C0A0 | TMSPVA | Starting address of old position, velocity and acceleration. |
| >3C160 | TMSDA | Starting address of diagnostic data. |

The control lines:

| Address | Signal | Description |
|---|---|---|
| >7E601 | FFGO | Also known as GO-PAL, 1 → enable level 6 VTICK interrupt, FF board in RUN mode. 0 → disable level 6 VTICK interrupt, FF board in DIAGNOSTIC mode. |
| >7EA01 | TMSRST | TMS320 reset line, 1 → put TMS in reset state. 0 → release TMS from reset state. |
| >7EA03 | BNKSEL | Ping-Pong memory bank selection line, 1 → bank 1; 0 → bank 0. |
| >7EA05 | STICK | Soft tick. 1 → use hardware to control bank selection; 0 → use software to control bank selection. |
| >7EA07 | TMSGO | TMS go line, 1 → start processing; 0 → stop processing. |

68k Shell Service Routine

The 68k shell service routines sets up the run time environment for both 68k microprocessor and TMS320 signal processor. It handles the communication between the TP and the SCM by setting up the handshaking flags in the shared RAM. Also, the 4 ms synchronization of the TP board with the VTICK interrupt, which interrupts 68k every 1 ms, is done. This is necessary since the calculation of feedforward torques by TMS320 will take approximately 2.9 ms. In order to log the torque data into the VAL controller, synchronization must be done. Interrupt service routines for handling level 6 VTICK interrupt, bus/address error and unexpected errors are built. Detailed descriptions are discussed as follows.

Start Up Routine

The following procedures describe the initial condition of the TP module and operations which the 68k will perform when the system powers up or has been reset.

1. Set up system stack, disable interrupt and put 68k into supervisor mode.
2. Put TMS320 into reset mode (>7EA01←0), select soft tick (>7EA05←0) and select Ping-Pong memory bank 0 (>7EA03←0).
3. Clear handshaking buffers in the shared RAM (SR), Ping-Pong memory and local RAM (LR).
4. Write out feedforward board (FF) ID code (which equals >4646) to SR location FFBRD (which equals >34000).
5. Copy TMS code (Newton-Euler dynamic equations) from EPROM at location >4000 to TMS program memory at location >40000.
6. Write out FF board initialization done code (which equals 1) to SR location EDINIT (which equals >34003).
7. Poll FF board go status (BDGO, at location >34002)
   if BDGO status is active (which equals 1), then proceed to step 8. Else, go back to step 7 and keep on polling BDGO.
8. Check FF board mode (BDMODE, at location >34004)
   if BDMODE=1, then FF board is in RUN mode.
   if BDMODE=0, then FF board is in DIAGNOSTIC mode.
   Write BDMODE (either 1 or 0) to FFGO which is at location >7E601.
9. Poll SEMA4 to see if new COMMAND comes in
   If SEMA4≠>55, go back to step 9 and keep on polling SEMA4.
   If SEMA4=>55, then check COMMAND bit 0:
   bit 0=0, which means initial position commands are not yet ready, go back to step 9 and keep on polling SEMA4. bit 0=1, which means initial position commands are ready, then proceed to step 10.

10. Copy initial position commands from SR to Ping-Pong memory and write out a >AA to SEMA4 to acknowledge copy done.
11. Release TMS320 from reset state by writing a 1 to location >7EA01, enable interrupt, then wait for 1 ms VTICK interrupt.

Note that, in step 11 of the start up procedure, 68k comes into an infinite loop and wait for the level 6 VTICK interrupt to invoke 68k every 1 ms. It is clear that, the operation of this torque loop calculation is purely interrupt driven. The following secton will discuss how the interrupt service routine activates the TMS320 Newton-Euler software.

Interrupt Service Routine

The level 6 VTICK auto-vector interrupt is provided by the SCM through the VME bus and interrupts the 68k on the TP P every 1 ms (tick). All other interrupts are treated as unexpected interrupts. Whenever an unexpected interrupt occurs, the service routine saves the contents of the present status register, the error code in the instruction register and the program counter, and then logs them into both the shared RAM and the local RAM error reporting area for the convenience of future debugging. Also, the present operation will be suspended until the system has been reset again.

A level 6 VTICK interrupt service routine is used having semaphores 'SEMA1' and 'SEMA2' which will indicate to the TP board if the position commands and the external forces and moments are ready in the shared RAM. If the semaphores are set, then the data can be copied from the SR to the Ping-Pong memory where the TMS can have access to. The variables 'CLOCK' and 'VLOCK' are used to maintain a 32 ms cycle. Since the VTICK interrupt invokes 68k every 1 ms, and the TMS has total of 4 ms to complete calculating one set of feedforward torques. So in the 32 ms cycle, the torque can be output 8 times. When system power up, the start up routine will set the 'CLOCK' and 'VCLOCK' to be zero, and the TP board will obtain the initial joint positions from the SCM. If the VAL is ready to start servoing, the SCM will set 'SEMA1' so that when the next VTICK interrupts the TP board, the 68k on the TP will copy the new position commands, and external forces and moments if they exist, into the Ping-Pong memory. The 'CLOCK' and 'VCLOCK' will be set to 3 and 8, respectively. Also, the TMS will be notified to call its subroutine 'CMDEXT' in the Newton-Euler software. Finally, set TMSGO. Note that, 'CLOCK' and 'VCLOCK' will mainly serve as two counters, where 'CLOCK' will count from 3 to 0, and 'VCLOCK' will count from 8 to 1. If 'VCLOCK' equals 0, it means that the servo has stopped and whenever the level 6 VTICK interrupt service routine is invoked, no operation will be performed. If the 'CLOCK' equals zero, it means that the 4 ms time is up, and the TMS should have finished calculating the feedforward torques. If the TMS is not ready yet (by checking if the content of location >7EA01 equals 2), then error occurs and the operation of the TP board will be suspended until the system reset. If the TMS is ready, then the torques are copied from the Ping-Pong memory to the SR and these torques can be incorporated into the VAL controller.

ARM DRIVE CONTROL

Figure 8:
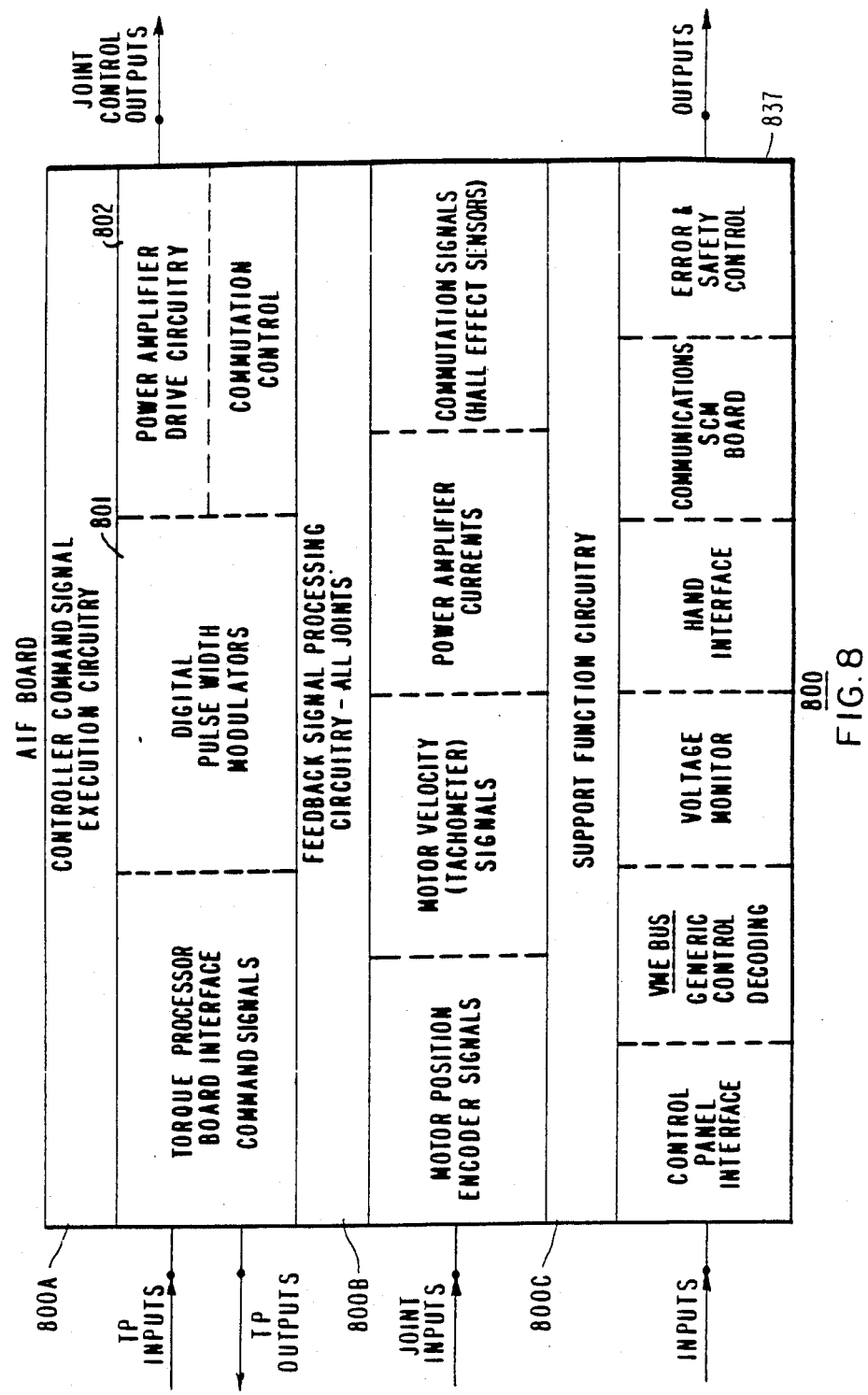
FIG. 8 shows a block diagram for an arm interface board employed in the system of FIG. 3.

As now further described, the higher level control looping generates voltage command signals to be executed through the AIF board 800 (FIG. 8) for the arm axes so that the arm effector is moved to commanded positions under controlled velocity, acceleration and torque in accordance with a user's robot or application program. Pulse width modulation circuitry 801 and drive circuitry 802 are provided on the AIF board 800 to develop axis drive signals, in this instance for application to power amplifiers which provide the drive currents to brushless D.C. electric motors respectively associated with the six axes of arm motion.

The AIF board circuitry processes the voltage command data to develop digital TTL logic level signals to control the base or gate drive circuitry of the power amplifiers which supply the motor drive currents to the axis motors. As previously indicated, the motor currents and axis position and velocity data are fed back through the AIF board 800 to the higher level control loops for closed loop position, velocity and torque control.

AIF BOARD—PULSE WIDTH MODULATION SCHEME

The pulse width modulation circuitry 801 on the AIF board 800 provides a digital interface for closing the torque or current control loop through the axis motor drive circuitry. The pulse width modulation concept is applied to control the conduction time width for the joint motor power switches and thereby satisfying motor voltage and torque commands.

Figure 9:
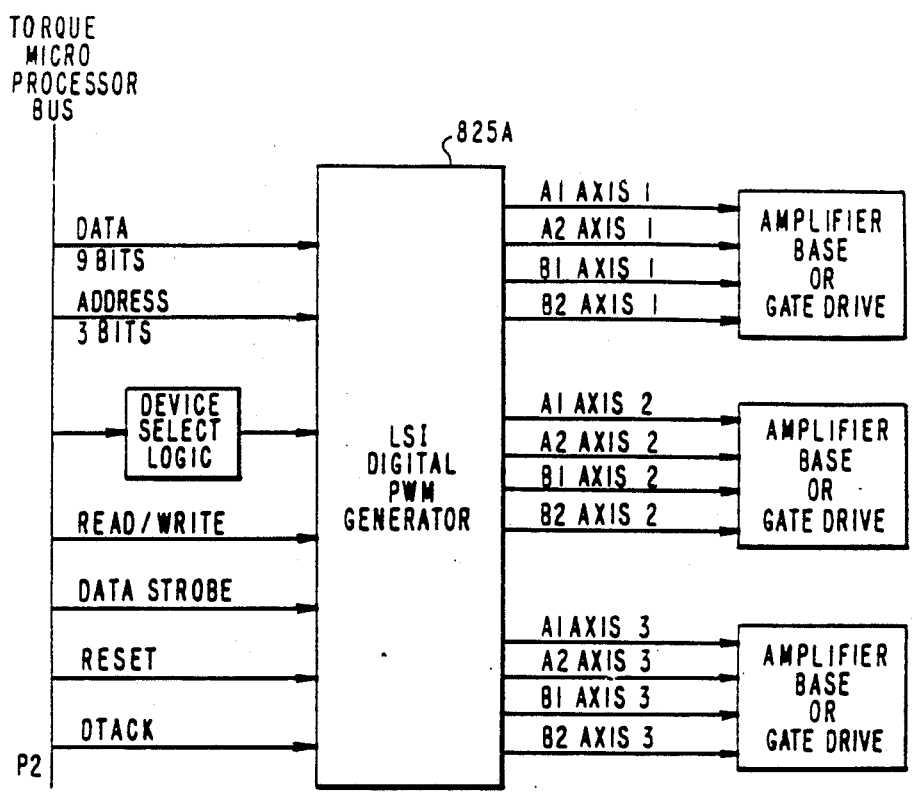
FIG. 9 shows a block diagram for a PWM circuit used on the AIF board to generate control signals for the joint motors.

As shown in the generalized block diagram of FIG. 9, a digital PWM generator 825A receives a 9 bit data commands and 3 register address bits on the torque microprocessor P2 bus. Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type.

Figure 10A:
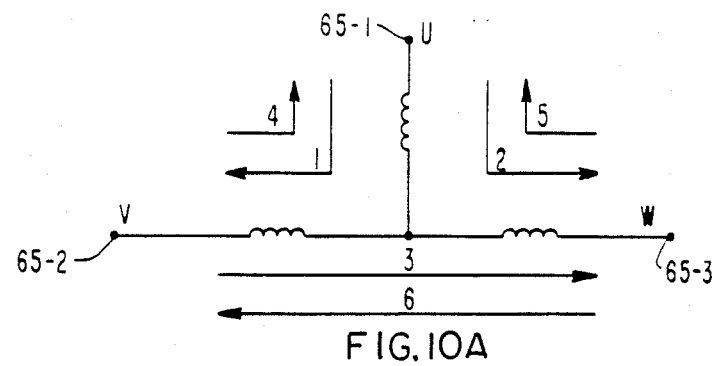
FIGS. 10A, 10B and 11 show bridge configuration for brushless and brush-type DC joint motors.
Figure 10B:
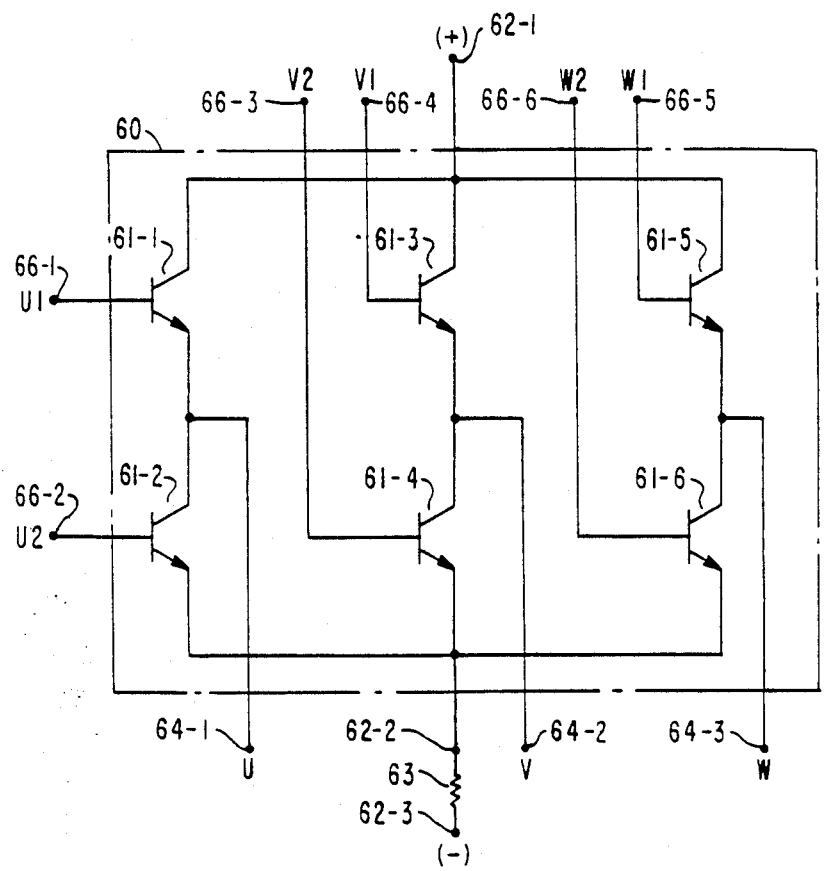

Four digital PWM control signals are employed to control the direction and magnitude of current flow through the motor windings through on/off power switch control. In the brushless DC motor embodiment, the three phase windings of the brushless DC motor are interconnected in a bridge circuit (FIG. 10A-B) such that the motor drive current is always directed through a pair of windings and the motor conduction path is rotated or commutated through successive winding pairs to produce the motor drive torque. In this arrangement, the PWM pulses determine the time span of motor current flow and commutation switching logic based on the PWM pulses and Hall effect sensor feedback signals determine the winding pairs through which, and the direction in which, drive current is to flow.

Figure 11:
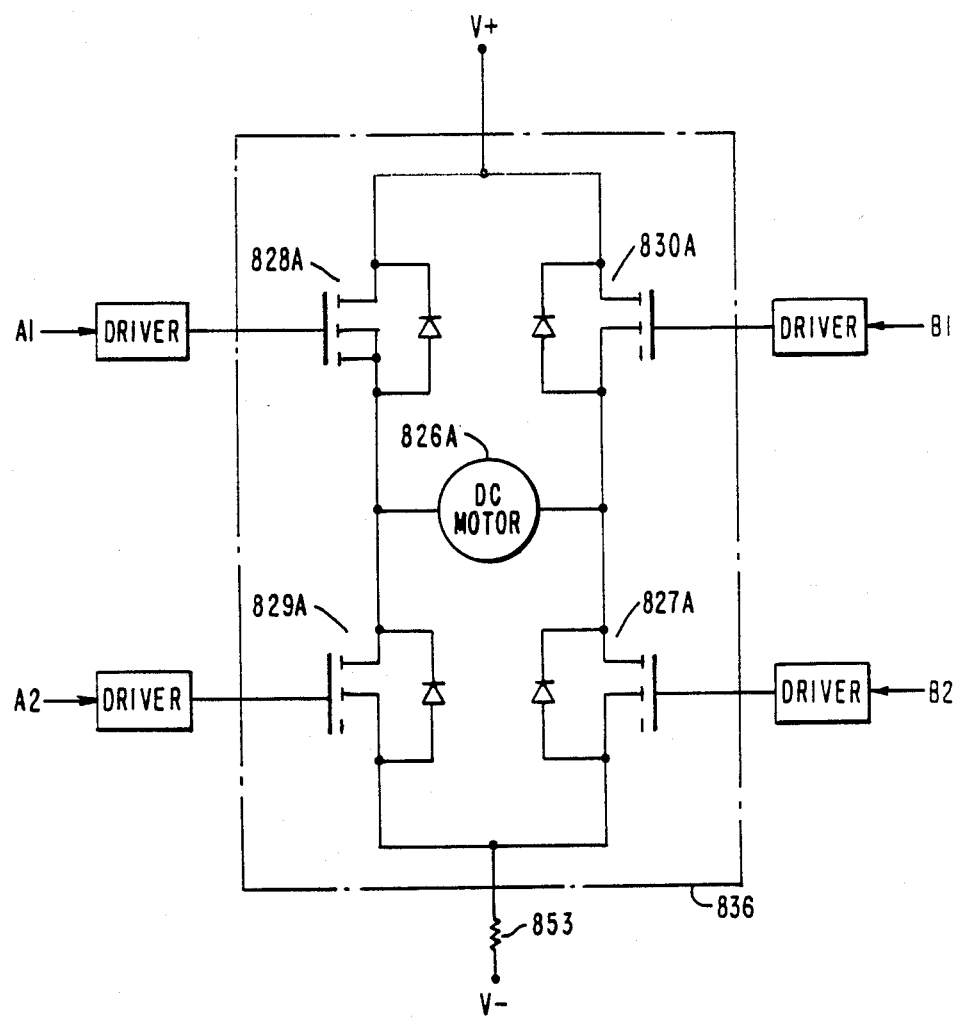
Figure 12:
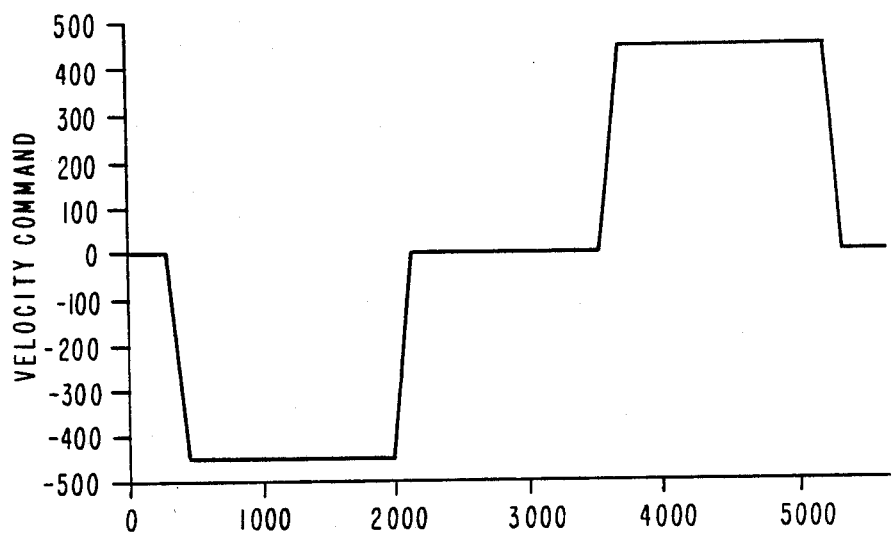
FIG. 12 shows a time plot of a velocity command employed in a robot control test.

In the DC brush type embodiment where an H type power amplifier bridge circuit is employed, DC brush type motor 826A (FIG. 11) is operated in one direction when power amplifier switches 827A and 828A are opened under control of PWM output signals A1 and B2, and it is operated in the opposite direction when power amplifier switches 829A and 830A are opened under control of PWM output signals B1 and A2.

The pulse width modulation circuitry is preferably embodied in a pair of large scale integrated pulse width modulation (PWM) chips. Generally, each PWM chip operates as a microprocessor peripheral device (i.e., under the control of a microprocessor higher in the control loop configuration) to provide digital pulse width modulated signal generation for control of three axes having DC brush type motor drives.

For more detail on motor current, position and velocity feedback and other AIF board circuitry reference is made to U.S. application Ser. No. 932,982, filed Nov. 20, 1988. For more detail on the PWM scheme reference is made to the U.S. application Ser. No. 932,841 filed the same date, and it has the Continuation Ser. No. 231,627.

We claim:

1. A control for a robot having a plurality of arm joints, said control comprising:
   an electric motor for driving each of the robot arm joints;
   a power amplifier operable to supply drive current to each motor;
   means for sensing load force applied to at least a predetermined one of said robot joints;
   means for computing the actual load moment for each robot joint on the basis of the output from said force sensing means;
   means for computing the dynamic/kinematic data moment for each robot joint on the basis of stored dynamic and kinematic data for the robor arm;
   means for combining the data and load moments for each joint to generate a feedforward torque therefor; and
   each joint motor having feedback control loop means including a torque control loop to generate motor commands for the associated power amplifier in accordance with position commands and in accordance with the feedforward torque.

2. A robot control as set forth in claim 1 wherein said data moment computing means employs the Newton-Euler dynamic equations to compute the respective joint data moments.

3. A robot control as set forth in claim 1 wherein said force sensing means is disposed at the endmost joint linked to the robot and effector, said load moment computing means computes the respective joint load moments in a backward recursion, and said data moment computing means employs the Newton-Euler dynamic equations in a forward recursion to compute the respective joint data moments.

4. A control for a robot having a plurality of arm joints, said control comprising:
   an electric motor for driving each of the robot arm joints;
   a power amplifier operable to supply drive current to each motor;
   each joint motor having feedback control loop means including position and velocity control loops driving a torque control loop in accordance with position commands to generate motor commands for controlling the associated power amplifier;
   means for sensing the motion of said joint motor and for generating position and velocity feedback signals respectively for combination with the position and velocity commands to generate an error signal as a torque command for each of said torque control loops from the corresponding position and velocity control loops;
   means for sensing load force applied to at least a predetermined one of said robot joints;
   means for computing the actual load moment for each robot joint in the basis of the output from said force sensing means;
   means for computing the dynamic/kinematic data moment for each robot joint on the basis of stored dynamic and kinematic data for the robot arm;
   means for combining the data and load moments for each joint and applying the combined moment as a feedforward torque for combination with said position and velocity errors in generating said torque command for each of said torque control loops; and
   means for generating a feedback signal representative of the joint motor drive current for combination with the torque command to generate a torque error signal in each torque control loop.

5. A robot control as set forth in claim 4 wherein said data moment computing means employs the Newton-Euler dynamic equations to compute the respective joint data moments.

6. A robot control as set forth in claim 5 wherein said force sensing means is disposed at the endmost joint linked to the end effector, said load moment computing means computes the respective joint load moments in a backward recursion, and said data moment computing means employs the Newton-Euler dynamic equations to compute the respective joint data moments in a forward recursion.

7. A robot control as set forth in claim 5 wherein the robot control is essentially fully digital, each feedback control loop means is digitally operable at a predetermined sampling rate to generate digital motor commands on the basis of digital position commands, each motor motion sensing means generates position and velocity feedback signals for control calculations in the position and velocity control loops, and each current feedback generating means generates digital signals for control calculations in the torque control loop.

8. A robot control as set forth in claim 7 wherein motion planning means generates said digital position commands, and the calculated torque for each joint is applied to said motion planner for comparison to available torque and reduction or increase in planned speed accordingly.

9. A robot control as set forth in claim 7 wherein said kinematic data includes joint offsets based on the length of each link and the twisting angle between adjacent links, and said dynamic data includes the inertia of each joint and the center of mass of each link.

10. A robot control as set forth in claim 1 wherein said kinematic data includes joint offsets based on the length of each link and the twisting angle between adjacent links, and said dynamic data includes the inertia of each joint and the center of mass of each link.

* * * * *